(12) United States Patent
Butcher et al.

(10) Patent No.: US 11,806,772 B2
(45) Date of Patent: Nov. 7, 2023

(54) OUTBOARD HYDROSTATIC BEARING ASSEMBLY FOR CAN BODYMAKER

(71) Applicant: Stolle Machinery Company, LLC, Centennial, CO (US)

(72) Inventors: Gregory H. Butcher, Cable, OH (US); Aaron E. Carstens, Centerville, OH (US); Kenneth E. Carper, Cincinnati, OH (US); Russell Bauer, West Chester, OH (US); Ian Kenneth Scholey, Barnsley (GB)

(73) Assignee: Stolle Machinery Company, LLC, Centennial, CO (US)

( * ) Notice: Subject to any disclaimer, the term of this patent is extended or adjusted under 35 U.S.C. 154(b) by 297 days.

(21) Appl. No.: 17/304,559

(22) Filed: Jun. 23, 2021

(65) Prior Publication Data
US 2021/0316353 A1 Oct. 14, 2021

Related U.S. Application Data

(63) Continuation of application No. 16/186,622, filed on Nov. 12, 2018, now Pat. No. 11,077,478, which is a
(Continued)

(51) Int. Cl.
*B21D 24/00* (2006.01)
*F16C 29/02* (2006.01)
(Continued)

(52) U.S. Cl.
CPC ............ *B21D 24/00* (2013.01); *F16C 29/004* (2013.01); *F16C 29/025* (2013.01); *B21D 22/28* (2013.01);
(Continued)

(58) Field of Classification Search
CPC ...... B21D 22/20; B21D 22/28; B21D 22/283; B21D 22/286; B21D 22/30; B21D 24/00;
(Continued)

(56) References Cited

U.S. PATENT DOCUMENTS

| 3,754,799 A | 8/1973 | Hedberg |
| 4,530,228 A * | 7/1985 | Snyder .................. B21D 22/28 |
| | | 72/347 |

(Continued)

OTHER PUBLICATIONS

Chinese National Intellectual Property Administration (CNIPA), CN Application No. 202011151788.8 first Office Action, dated Apr. 25, 2022, 28 pages.

*Primary Examiner* — Peter Dungba Vo
*Assistant Examiner* — Joshua D Anderson
(74) *Attorney, Agent, or Firm* — Eckert Seamans Cherin & Mellott, LLC

(57) ABSTRACT

A hydrostatic/hydrodynamic fluid bearing assembly for a can bodymaker is provided. The hydrostatic/hydrodynamic fluid bearing assembly is separate from the ram body. The outboard guide bearing assembly includes a carriage assembly and a number of elongated journals. The carriage assembly includes a ram coupling, a crank coupling, and body defining a number of journal passages. The ram body is coupled to a ram coupling. The crank coupling is structured to be coupled to a crank arm. Each journal extends through a carriage assembly body journal passage. In this configuration, the ram body may form a can body in a traditional manner, but fluid bearing assembly fluid is not applied to the ram body. Instead, the fluid bearing assembly fluid is applied to the journals.

11 Claims, 24 Drawing Sheets

Related U.S. Application Data continuation of application No. 14/993,159, filed on Jan. 12, 2016, now Pat. No. 10,137,490, which is a continuation-in-part of application No. 14/470,987, filed on Aug. 28, 2014, now Pat. No. 9,533,338.

(60) Provisional application No. 61/870,831, filed on Aug. 28, 2013.

(51) Int. Cl.
| | | |
|---|---|---|
| *F16C 29/00* | (2006.01) | |
| *B21D 22/28* | (2006.01) | |
| *B21D 51/26* | (2006.01) | |
| *B30B 15/04* | (2006.01) | |
| *B30B 1/14* | (2006.01) | |

(52) U.S. Cl.
CPC ............. *B21D 51/26* (2013.01); *B30B 1/14* (2013.01); *B30B 15/041* (2013.01)

(58) Field of Classification Search
CPC ........ B21D 37/18; B21D 51/24; B21D 51/26; B30B 1/10; B30B 1/14; B30B 1/268; B30B 15/041; B23Q 1/38; F16C 29/004; F16C 29/005; F16C 29/025
See application file for complete search history.

(56) References Cited

U.S. PATENT DOCUMENTS

| | | |
|---|---|---|
| 4,653,408 A | 3/1987 | Nagashima et al. |
| 6,419,394 B1 * | 7/2002 | Kashchenevsky .... F16C 29/025 384/12 |
| 2015/0059428 A1 | 3/2015 | Butcher et al. |

* cited by examiner

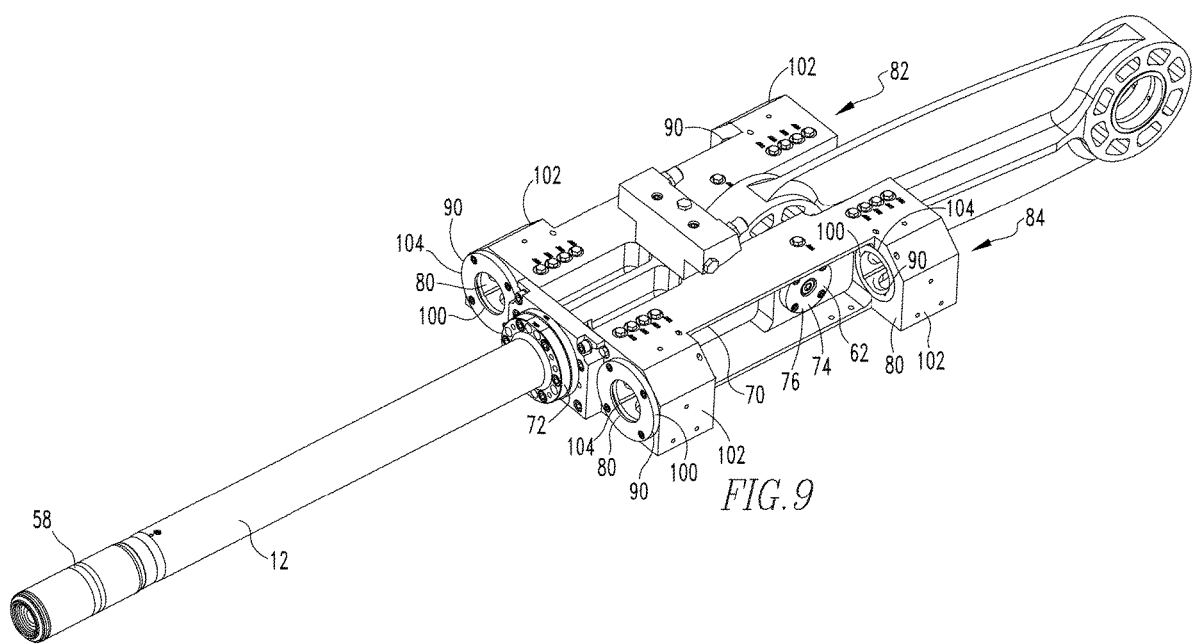

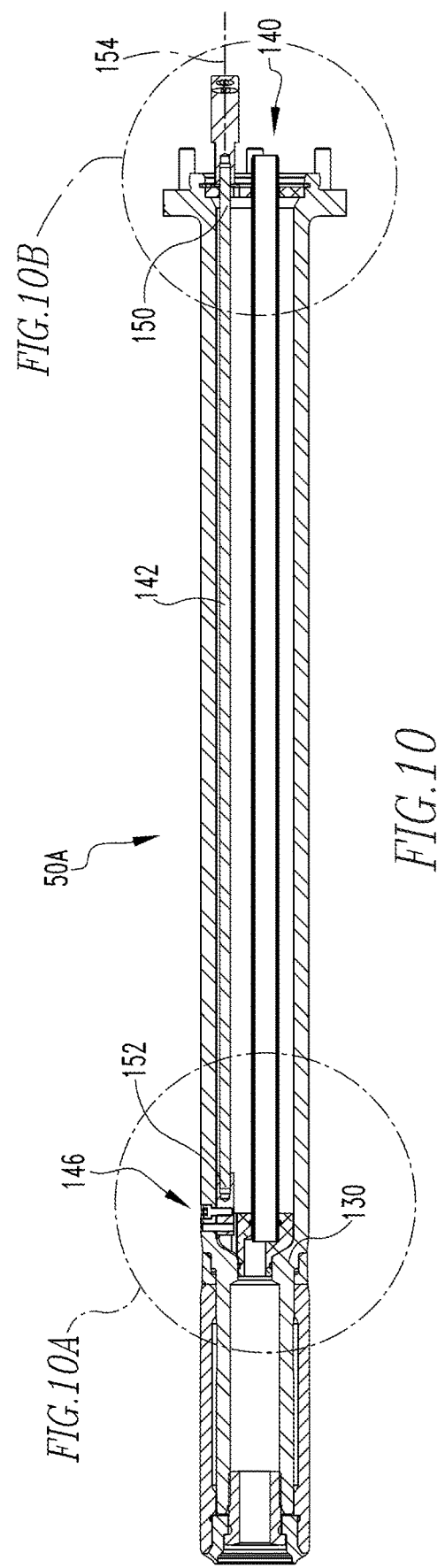

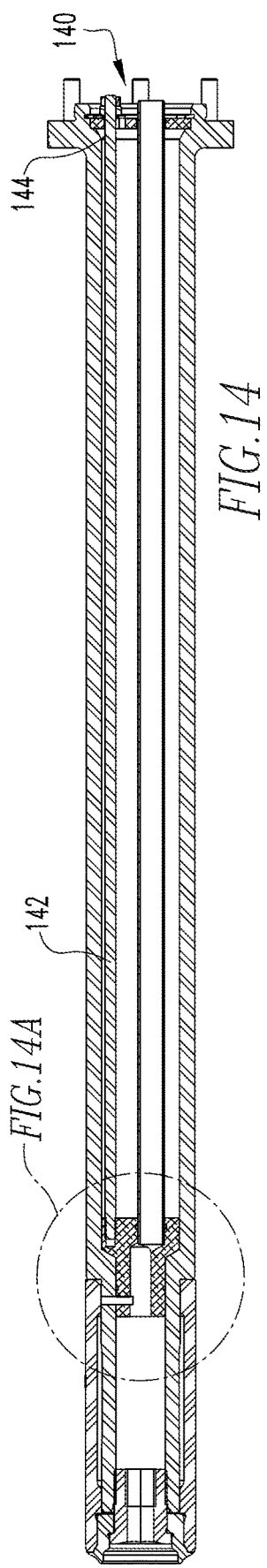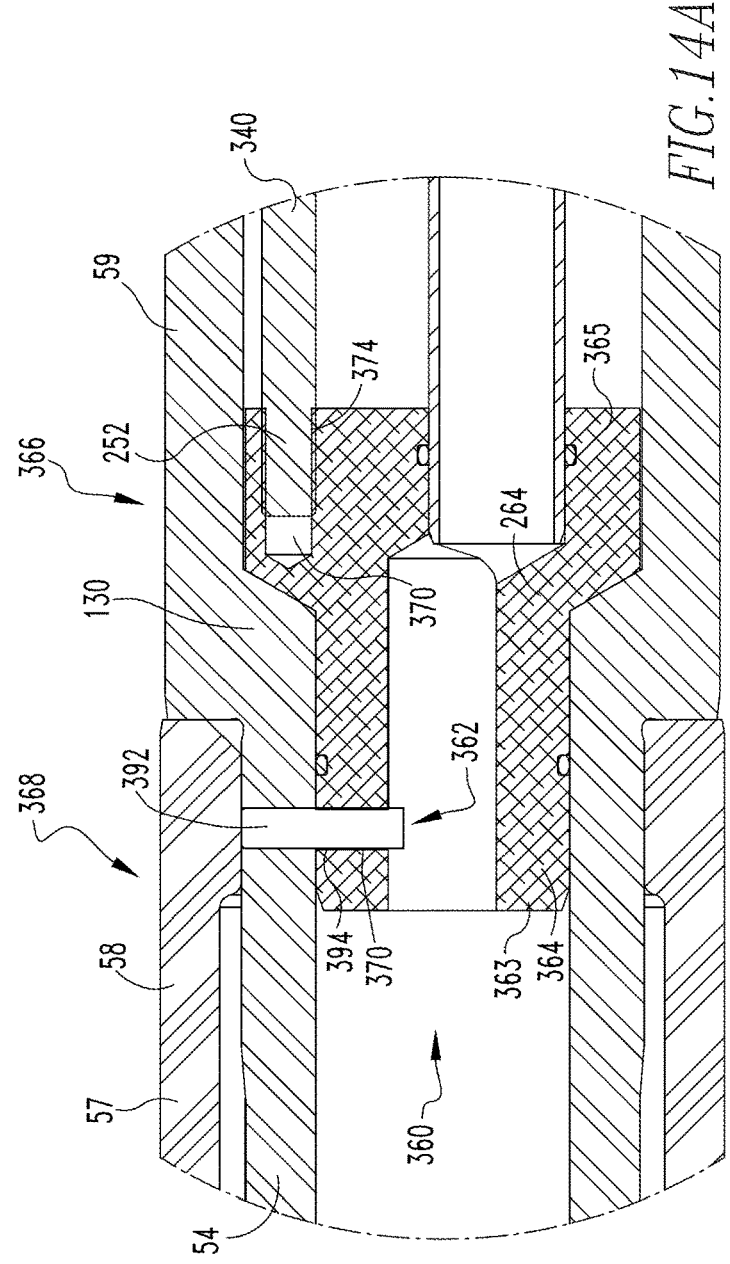

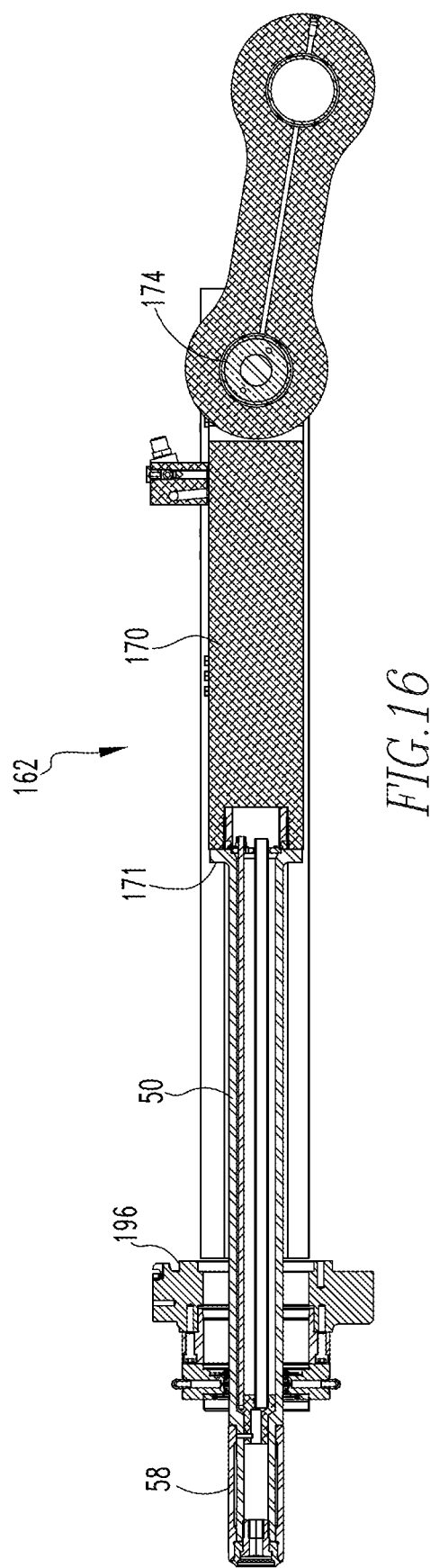

| BEAM TYPE | SLOPE AT FREE END | DEFLECTION AT ANY SECTION IN TERMS OF x | MAXIMUM DEFLECTION |
|---|---|---|---|
| 1. Cantilever Beam—Concentrated load P at free end | $\Theta = \dfrac{Pl^2}{2EI}$ | $y = \dfrac{Px^2}{6EI}(3l-x)$ | $\delta_{max} = \dfrac{Pl^3}{3EI}$ |

FIG. 17

| BEAM TYPE | SLOPE AT FREE END | DEFLECTION AT ANY SECTION IN TERMS OF x | MAXIMUM DEFLECTION |
|---|---|---|---|
| 3. Cantilever Beam—Uniformly distributed load $\omega$ (N/m) | $\Theta = \dfrac{\omega l^3}{6EI}$ | $y = \dfrac{\omega x^2}{6EI}(x^2 + 6l^2 - 4lx)$ | $\delta_{max} = \dfrac{\omega l^4}{8EI}$ |

FIG. 18

OUTBOARD HYDROSTATIC BEARING ASSEMBLY FOR CAN BODYMAKER

CROSS-REFERENCE TO RELATED APPLICATIONS

This application is a continuation of U.S. patent application Ser. No. 16/186,622 filed Nov. 12, 2018, which application is a continuation of U.S. patent application Ser. No. 14/993,159, filed Jan. 12, 2016 (now U.S. Pat. No. 10,137, 490), which application is a continuation-in-part of U.S. patent application Ser. No. 14/470,987, filed Aug. 28, 2014 (now U.S. Pat. No. 9,533,338), which application claims the benefit of U.S. Provisional Patent Application Ser. No. 61/870,831, filed Aug. 28, 2013, all of which are incorporated by reference as if fully set forth herein.

FIELD OF THE INVENTION

The disclosed and claimed concept relates to a can bodymaker and, more specifically, to a can bodymaker wherein the ram assembly includes outboard bearings and a ram body having a reduced length.

BACKGROUND OF THE INVENTION

Generally, an aluminum can begins as a disk of aluminum, also known as a "blank," that is punched from a sheet or coil of aluminum. That is, the sheet is fed into a dual action press where a "blank" disc is cut from the sheet by an outer slide/ram motion. An inner slide/ram then pushes the "blank" through a draw process to create a cup. The cup has a bottom and a depending sidewall. The cup is fed into one of several bodymakers, which perform a redraw and ironing operation. More specifically, the cup is disposed in a can forming machine at the mouth of a die pack having substantially circular openings therein. The cup is held in place by a redraw sleeve, which is part of the redraw assembly. The redraw sleeve is a hollow tubular construct that is disposed inside the cup and biases the cup against the die pack. More specifically, the first die in the die pack is the redraw die, which is not a part of the redraw assembly. The cup is biased against the redraw die by the redraw sleeve. Other dies, the ironing dies, are disposed behind, and axially aligned with, the redraw die. The ironing dies and redraw die are not part of the redraw assembly. An elongated, cylindrical ram assembly 1PA (prior art), shown in FIGS. 1 and 1A, includes a carriage 2PA that supports a ram body 3PA with a punch 4PA at the forward, distal end. The ram and punch are aligned with, and structured to travel through, the openings in the redraw die and the ironing dies. At the end of the die pack opposite the ram is a domer. The domer is a die structured to form a concave dome in the bottom of the cup/can.

Thus, in operation, a cup is disposed at one end of the die pack. The cup, typically, has a greater diameter than a finished can as well as a greater wall thickness. The redraw sleeve is disposed inside of the cup and biases the cup bottom against the redraw die. The opening in the redraw die has a diameter that is smaller than the cup. The elongated ram body, and more specifically the punch, passes through the hollow redraw sleeve and contacts the bottom of the cup. As the ram body continues to move forward, the cup is moved through the redraw die. As the opening in the redraw die is smaller than the original diameter of the cup, the cup is deformed and becomes elongated with a smaller diameter. The wall thickness of the cup typically remains the same as the cup passes through the redraw die. As the ram continues to move forward, the elongated cup passes through a number of ironing dies. The ironing dies each thin the wall thickness of the cup causing the cup to elongate. The final forming of the can body occurs when the bottom of the elongated cup engages the domer, creating a concave dome in the cup bottom. At this point, and compared to the original shape of the cup, the can body is elongated, has a thinner wall, and a domed bottom.

During this operation, heat is created by friction in both the ram assembly and the die pack. This heat is dissipated by a cooling fluid that passes through and over the surface of the components. The cooling fluid disposed on the surface of the ram body is substantially collected by a seal assembly disposed between a hydrostatic/hydrodynamic bearing assembly and the redraw (or hold down) assembly. The seal assembly includes a number of seals that conform to the cross-sectional shape of the ram body. As the ram body passes through the seal assembly, the cooling fluid is collected and recycled.

After the forming operations on the can body are complete, the can body is ejected from the ram, and more specifically the punch, for further processing, such as, but not limited to trimming, washing, printing, flanging, inspecting and placed on pallets, which are shipped to the filler. At the filler, the cans are taken off of the pallets, filled, ends placed on them and then the filled cans are repackaged in six packs and/or twelve pack cases, etc.

The ram body moves in a cycle many times each minute. To accomplish this motion, the bodymaker also includes a crank assembly having a crank arm. The crank arm is coupled to the ram assembly and causes the ram assembly to reciprocate. The ram body is substantially, axially aligned with the hollow redraw sleeve and the die pack. The alignment is important because a mis-alignment causes the ram to wear on the dies and vice-versa. As shown in FIG. 1A, alignment of the ram body is improved by a hydrostatic/hydrodynamic ram guide assembly 5PA that guides the ram body through the tooling, hereinafter a "ram guide." There are additional hydrostatic/hydrodynamic fluid bearing assemblies 6PA on the sides of the ram assembly carriage, but these bearings do not "guide" the ram. These hydrostatic/hydrodynamic fluid bearing assemblies 6PA are disposed in channels and have ports 7PA, disposed on the top, side, and lower surfaces, that produce a lubricating fluid. Various factors, such as, but not limited to, the relatively short length of the carriage, wherein the hydrostatic/hydrodynamic fluid bearing assemblies 6A are immediately adjacent each other, prevent these additional hydrostatic/hydrodynamic fluid bearing assemblies 6PA from controlling the orientation and alignment of the ram body. That is, the small amount of "wobble" of the carriage in the channels prevents the carriage and the hydrostatic/hydrodynamic fluid bearing assemblies 6PA from guiding the ram body.

Thus, as used herein, a "guide," when used in reference to a ram body bearing, means to control the orientation and alignment of the ram body. Thus, a "guide bearing" or "guide bearing assembly," as used herein, is structured to, and does, control the orientation and alignment of the ram body. A bearing, such as the prior art hydrostatic/hydrodynamic fluid bearing assemblies 6PA on the sides of the ram assembly carriage, that have a minimal influence or are merely capable of affecting the orientation and alignment of the ram body are not "guide" bearing assemblies, as used herein. Stated alternately, and noting that a ram body must be guided, if the ram body has no guide, then the bearing assemblies on the sides of the ram carriage are the "guide bearing assemblies." If, however, the ram body has a guide, then the bearing assemblies on the sides of the ram carriage are not "guide bearing assemblies."

The guide bearing assembly is, typically, disposed immediately upstream (closer to the crank arm) of the redraw assembly. The fluid bearing assembly includes a body defining a passage. The ram body extends through the fluid bearing assembly passage. Moreover, the fluid bearing assembly introduces a fluid, such as, but not limited to oil, between the fluid bearing assembly body and the ram body. Controlling the amount and pressure of the fluid allows for precise control over the alignment of the ram body with the hollow redraw sleeve and the die pack. The fluid bearing assembly fluid is collected by the seal assembly and recycled.

The disadvantage to this configuration is that the fluid bearing assembly fluid is not completely removed by the seal assembly. Thus, a portion of the fluid bearing assembly fluid remains on the ram body when the cooling fluid is applied. Further, the fluids mix and the collected cooling fluid becomes contaminated. This also means that the fluid bearing assembly fluid, which may be an expensive oil, is slowly lost.

Another disadvantage is that the ram body must have a sufficient length not only to extend through the die pack, but the seal assembly and fluid bearing assembly; for a can body of a typical 12 fluid ounce can, the ram body has a length of between about 50 inches to 52 inches when using a 24 inch stroke for a can body of a typical 12 fluid ounce can. Ram lengths differ for different stroke lengths to support different size can bodies. For example, the following is a table of common ram lengths and the associated stroke.

| Ram Length Range | A Specific Embodiment | Exemplary Stroke Length |
| --- | --- | --- |
| 45.0 to 46.0 Inches | 45.387 Inches | 18 Inches |
| 49.0 to 51.813 Inches | 50.0 Inches | 22 Inches |
| 50.0 to 52.0 Inches | 51.0 Inches | 24 Inches |
| 56.0 to 58.0 Inches | 57.0 Inches | 30 Inches |

A ram body of any of these lengths is prone to damage from normal wear and tear.

As noted above, the ram body passes through a die pack in a first direction when forming a can body, and then travels back through the die pack after the can body is formed. The die pack in the bodymaker has multiple, spaced dies, each die having an opening. Each die opening is slightly smaller than the next adjacent upstream die. Because the openings in the subsequent dies in the die pack have a smaller inner diameter, i.e., a smaller opening, the aluminum cup is thinned as the ram moves the aluminum through the rest of the die pack. The space between the punch and the redraw die is typically a small clearance (0.001-2 inch per side) over metal thickness and is less than 0.004 inch in the last ironing die. Typical aluminum gauge used to create a typical 12 fluid ounce can is 0.0108 inch in practice today. This narrow spacing, however, is a disadvantage, especially during the return stroke.

Ram droop or deflection is inherent to this long slender horizontal ram and punch with stroke lengths varying from 22-30 inches and throughput frequencies ranging from 210 to 450 strokes/minute (SPM) depending on can diameter, can height and machine model. In its simplest form, this ram can be visualized as a cantilever beam fixed at one end and free on the other end. The upper theorized beam type shows the deflection of the ram due to the tungsten carbide punch weight and the lower theorized beam type shows the deflection of the long steel ram due to its own weight. The total deflection of the horizontal ram in a known bodymaker is a combination of these two effects. The typical weight of the ram and punch assembly is approximately 50 lbf total. The maximum deflection ($\delta$) or ram droop is linearly proportional to the weight (point load P or distributed load w) of the long slender light weight steel ram ($\rho_{steel}$=0.284 lb/in$^3$) and heavy tungsten carbide (or WC-$\rho_{WC}$=0.567 lb/in$^3$) punch at the end of the ram. However, the maximum deflection or ram droop (conceptualized as a cantilever beam) is governed by its length (l) to the fourth power for the long slender steel ram and to the third power for the heavy carbide punch at the end of the ram. I is the area moment of inertia, as is known. Therefore, significant reduction in deflection or ram droop can be realized if the ram could be shortened. The concept to outboard the hydrostatic/hydrodynamic ram bearings from the main ram itself is essential to shortening the length of the ram because the ram no longer requires additional length to be supported by the bearing through the can body making process. Ram droop is a problem on the return stroke where a can is not being formed. In the return stroke, the punch and ram have more of a tendency to contact the tooling causing wear and damage. A significant contributor to this is contact between the punch and the ironing dies (primarily third iron or end iron) on the return stroke of the machine.

Further, as noted above, a ram body passes through a hydrostatic/hydrodynamic fluid bearing assembly. The hydrostatic/hydrodynamic fluid bearing assembly is fixed to a bulkhead in the can bodymaker housing assembly. This means that the length of the cantilevered portion of the ram body changes during the body making cycle. That is, when the ram body is in a retracted, first position, the length of the cantilevered portion of the ram body is relatively short. Conversely, when the ram body is in an extended, second position, the length of the cantilevered portion of the ram body is relatively long. The dynamic nature of the length of the cantilevered portion of the ram body means that the amount of droop changes dynamically as well. This means that a system to compensate for the ram droop would have to be a dynamic system as well.

Further, ram droop, as well as any other contact between the ram body and the die pack cause the ram body to become misaligned with the die pack. Stated alternately, contact between the ram body and the die pack creates an offsetting force acting in various directions about the ram assembly center of gravity. These offsetting forces create a torque about the ram assembly center of gravity resulting in the "wobble" discussed above. This is a disadvantage.

There is, therefore, a need for a ram assembly including a ram body that is less susceptible to ram droop. There is, more specifically, a need for a ram body having a reduced length. That is, the length of the ram body is a stated problem.

SUMMARY OF THE INVENTION

These needs, and others, are met by at least one embodiment of this invention which provides in one embodiment, a ram assembly with a ram body having a diameter of about 2.0 to 2.5 inches, e.g., for a typical 12 fluid oz. can, and a length of between about 30.0 inches and 32.0 inches, or about 31.0 inches. In another exemplary embodiment, wherein a ram seal assembly is used, the ram body has a length of between about 33.0 inches to about 36.0 inches, or about 34.5 inches. In this embodiment, the ram body has a diameter of about 1.5 to about 3.5 inches, or about 2.5 inches, for a typical 12 fluid oz. can.

In another embodiment, a can bodymaker ram assembly includes an outboard guide bearing assembly. The outboard guide bearing assembly is "outboard;" that is, as used herein, spaced, from the ram body. The outboard guide bearing assembly includes a carriage assembly and a bearing assembly. The bearing assembly, in an exemplary embodiment, includes two bearings disposed on the lateral sides of the carriage assembly. In an exemplary embodiment, the bearing assemblies are hydrostatic/hydrodynamic bearing assemblies. Use of an outboard guide bearing assembly allows for a shorter ram body in that the ram body does not need to extend through a bearing assembly as well as the die pack.

In another embodiment, a can bodymaker ram assembly includes an elongated, generally hollow ram body and a tension assembly. The ram body includes a proximal end, a medial portion, and a distal end. The tension assembly includes an elongated support member. The tension assembly support member includes a proximal end and a distal end. The tension assembly support member is substantially disposed within the ram body with the tension assembly support member proximal end coupled to the ram body proximal end, and the tension assembly support member distal end coupled to one of the ram body medial portion or the ram body distal end.

In another embodiment, the carriage assembly guide bearing assemblies are structured to orient the ram body with the passage through the die pack. That is, the carriage assembly guide bearing assemblies include fluid producing elements that are sufficiently spaced so as to alter the orientation of a ram body, or a punch, in a manner intended to position the longitudinal axis of the ram body to move over a selected path of travel (which is aligned with the longitudinal axis of the die pack passage), and, the carriage assembly guide bearing assemblies produce a sufficient, but reasonable, amount of fluid to establish an aligning fluid bearing stiffness.

BRIEF DESCRIPTION OF THE DRAWINGS

A full understanding of the invention can be gained from the following description of the preferred embodiments when read in conjunction with the accompanying drawings in which:

FIG. 9 is an isometric view of an outboard carriage assembly.

FIG. 10 is a cross-sectional view of another embodiment of the ram body.

FIG. 14 is a cross-sectional view of another embodiment of the ram body. FIG. 14A is a detail cross-sectional view of another embodiment of the medial and distal portions of the ram body.

FIG. 16 is a cross-sectional view of an outboard guide bearing assembly.

FIG. 17 is a table showing a formula for ram deflection.

FIG. 18 is a table showing a formula for cantilever beam load.

DETAILED DESCRIPTION OF THE INVENTION

Figure 1:
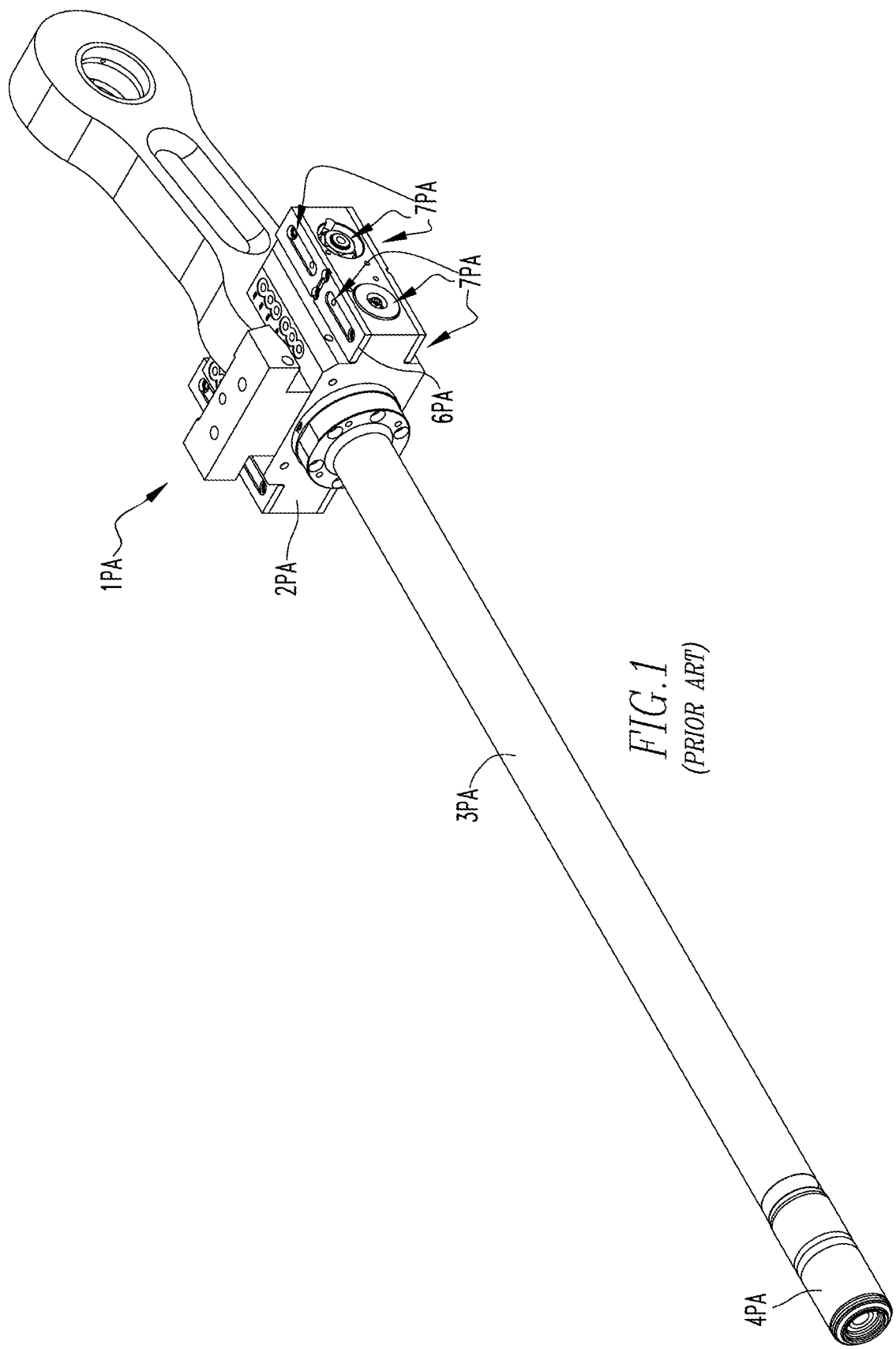
FIGS. 1 and 1A are isometric views of a prior art ram assembly.
Figure 1A:
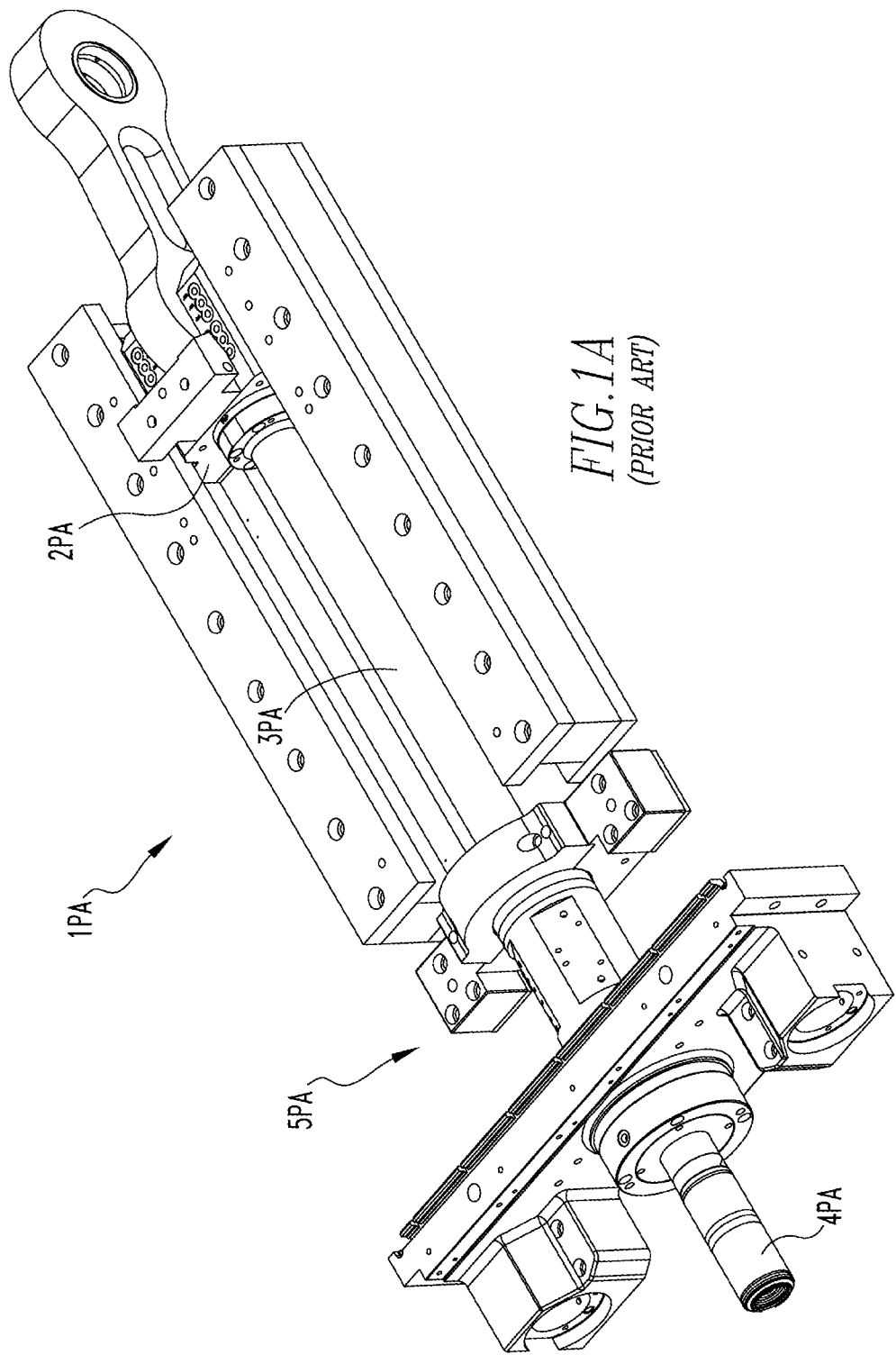
Figure 1B:
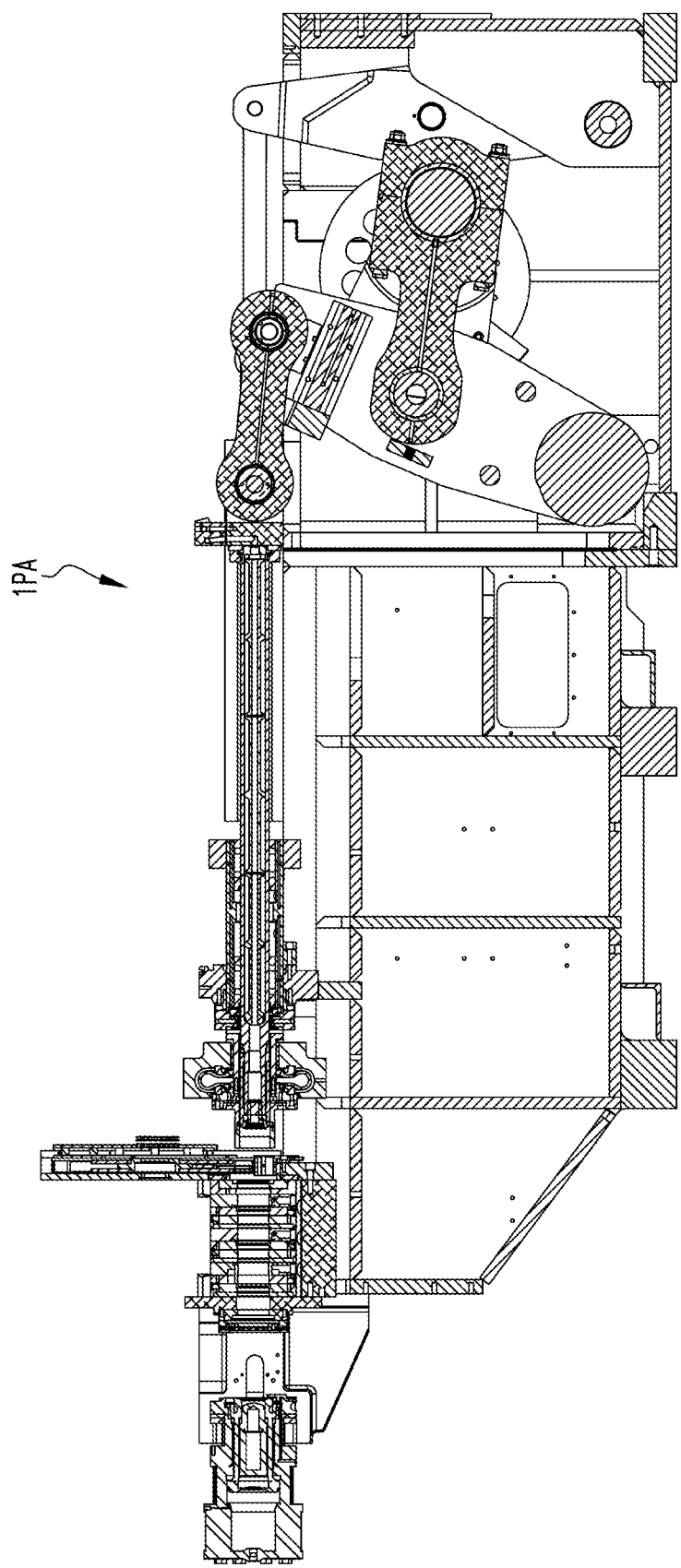
FIG. 1B is a side view of a prior art ram assembly.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the statement that two or more parts or components "engage" one another shall mean that the elements exert a force or bias against one another either directly or through one or more intermediate elements or components.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. Further, as used herein, "loosely correspond" means that a slot or opening is sized to be larger than an element disposed therein. This means that the increased size of the slot or opening is intentional and is more than a manufacturing tolerance. Further, with regard to a surface formed by two or more elements, a "corresponding" shape means that surface features, e.g. curvature, are similar.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb or "be an [X]"]" recites structure and not function. Further, as used herein, "structured to [verb or "be an [X]"]" means that the identified element or assembly is intended to, and is designed to, perform the identified verb or to be an [X]. Thus, an element that is only possibly "capable" of performing the identified verb but which is not intended to, and is not designed to, perform the identified verb is not "structured to [verb or "be an [X]"]."

As used herein, "at" means on or near.

As used herein, "cantilever" means a projecting beam or other horizontal member supported at one or more points.

As used herein, a "tension member" is a construct that has a maximum length when exposed to tension, but is otherwise substantially flexible, such as, but not limited to, a chain or a cable.

Figure 2:
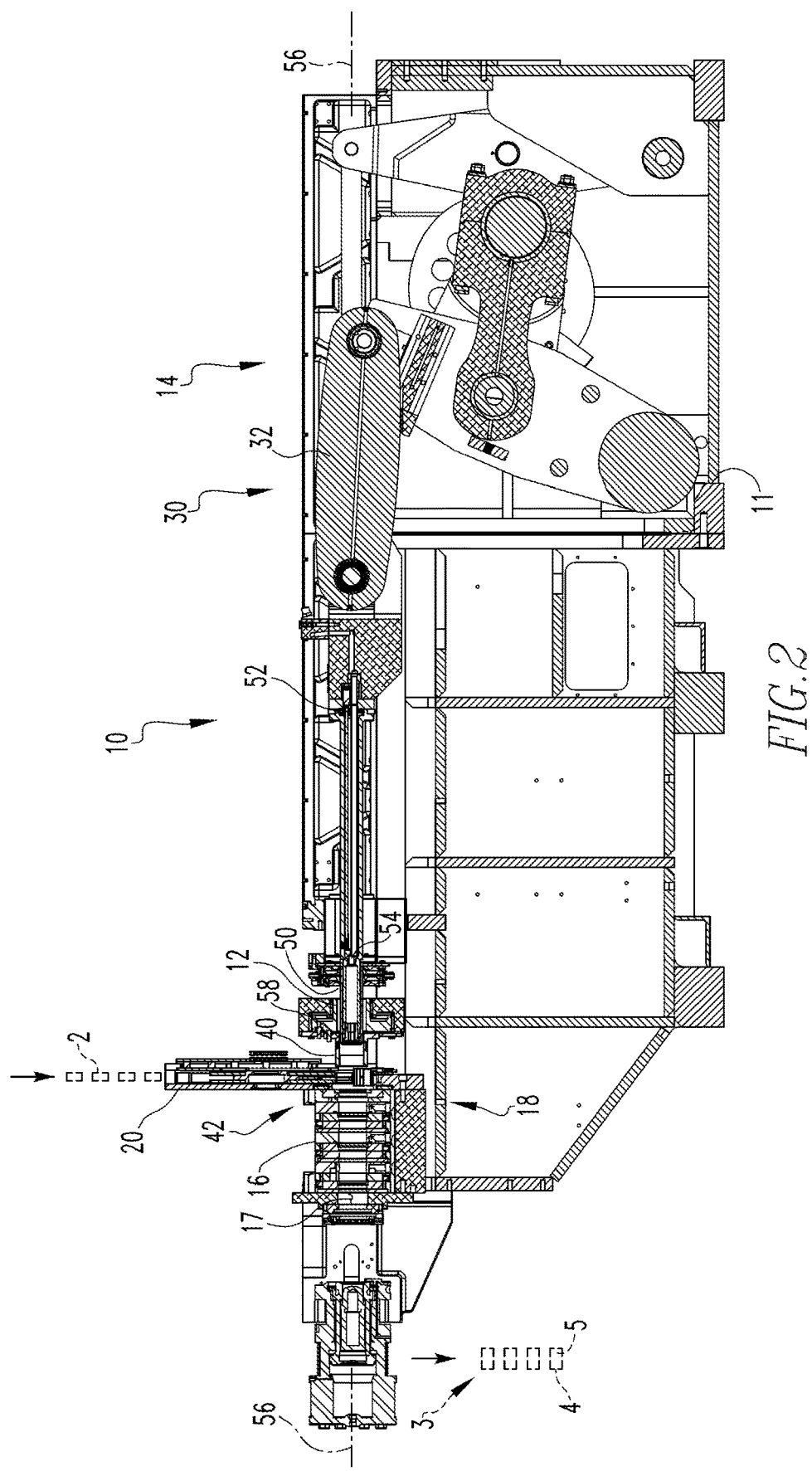
FIGS. 2, 3, and 4 show a side cross-sectional view of a bodymaker with the ram assembly in a first position, an intermediate position, and a second position, respectively.

As shown in FIGS. 2-7, a can bodymaker 10 is structured to convert a cup 2 (FIG. 2) into a can body 3 (FIG. 2). As described below, the cup 2, the ram body 50, the passage through the die pack 16, and other elements are assumed to have a substantially circular cross-section. It is understood, however, that the cup 2, as well as the resulting can body 3 and elements that interact with the cup 2 or can body 3, may have a shape other than substantially circular. A cup 2 has a bottom member 4 with a depending sidewall 5 defining a substantially enclosed space (none shown). The end of the cup bottom member 4 is open.

The can bodymaker 10 includes a housing assembly 11, a reciprocating ram assembly 12, a drive mechanism 14, a die pack 16, a redraw assembly 18 and a cup feeder 20. Each of the elements identified above are coupled to the housing assembly 11. In an exemplary embodiment, the drive mechanism 14 includes a crank assembly 30 including a reciprocating crank arm 32. As is known, in each cycle the cup feeder 20 positions a cup 2 in front of the die pack 16 with the open end facing the ram assembly 12. The die pack 16 defines a passage 17 through a number of dies (not shown). When the cup 2 is in position in front of the die pack 16, a redraw sleeve 40 biases the cup 2 against a redraw die 42. As is known, the drive mechanism 14 drives the redraw sleeve 40, e.g., via a number of secondary crank arms 36 (FIG. 5), and is timed so that the redraw sleeve 40 advances just before the ram assembly 12 advances. In an exemplary embodiment, the housing assembly 11 does not include a seal assembly for the ram body 50. That is, as the ram is not lubricated, the ram body 50 does not extend through a seal assembly structured to collect lubricant.

Generally, the ram assembly 12 includes an elongated, substantially circular, ram body 50 with a proximal end 52, a distal end 54, and a longitudinal axis 56. The ram body distal end 54 includes a punch 58. The ram body proximal end 52 is coupled to the drive mechanism 14. The drive mechanism 14 provides a reciprocal motion to the ram body 50 causing the ram body 50 to move back and forth generally along its longitudinal axis 56. That is, the ram body 50 is structured to reciprocate between a retracted, first position and a forward, second position over a selected path of travel. In the first, retracted position, the ram body 50 is spaced from the die pack 16. In the second, extended position, the ram body 50 extends through the die pack 16. Thus, the reciprocating ram assembly 12 advances forward (to the left as shown) passing through the redraw sleeve 40 and engaging the cup 2. The cup 2 is moved through the redraw die 42 and a number of ironing dies (not shown) within the die pack 16. The cup 2 is converted into a can body 3 within the die pack 16 and then removed therefrom. It is understood that, as used herein, a "cycle" means the cycle of the ram assembly 12 which begins with the ram assembly 12 in the first, retracted position.

Thus, as the punch 58 carrying the can body 3 passes through the die pack 16, the can body 3 is deformed and, more specifically, the can body 3 becomes elongated while the sidewall 5 becomes thinner. At the end of the forming stroke, a dome may be formed in the can bottom member 4 by known methods. Further, at the start of the return stroke, the can body 3 is ejected from the punch 58 by any known method or device such as, but not limited to a stripper device or delivering a compressed gas to the inner side of the can body 3. At the start of the next forming stroke a new cup 2 is disposed over the end of the punch 58.

As shown in FIGS. 5-9, the ram assembly 12, in an exemplary embodiment, also includes an outboard guide bearing assembly 60. In a first exemplary embodiment, the outboard guide bearing assembly 60 includes a carriage assembly 62 and a number of elongated journals 64. In one embodiment, not shown, there is a single journal 64 disposed vertically below, and aligned with, i.e., parallel to but spaced from, the ram body 50. In the embodiment shown, there are two journals 64, a first journal 66 and a second journal 68, that are generally horizontally aligned with, i.e., in the same general horizontal plane as, the ram body 50. In an exemplary embodiment, the first and second journals 66, 68 are slightly longer than the stroke length of the ram assembly 12 and are coupled to the bodymaker housing assembly 11.

The carriage assembly 62, for the embodiment with two journals 66, 68, includes a generally rectangular body 70 that includes a ram coupling 72, a crank coupling 74, and which defines a number of journal passages 80. In an exemplary embodiment, the ram coupling 72 is structured to support the ram body 50 in a substantially horizontal orientation. The crank coupling 74, in an exemplary embodiment, is a substantially circular bearing 76 that is structured to extend through a substantially circular opening (not shown) on the crank arm 32.

In an exemplary embodiment, the number of journal passages 80 includes a first pair of substantially aligned journal passages 82 and a second pair of substantially aligned journal passages 84. The journal passages 80 in each pair of journal passages 82, 84, are spaced. In an exemplary embodiment, the journal passages 80 in each pair of journal passages 82, 84 are longitudinally spaced by about 8.0 to 12.0 inches, or about 10.25 inches. The first journal 66 extends through the first pair of substantially aligned journal passages 82, and, the second journal 68 extends through the second pair of substantially aligned journal passages 84. In an exemplary embodiment, the journal passages 80 are disposed at each corner of the carriage assembly rectangular body 70.

The journal passages 80 in each pair of journal passages 82, 84, each include a bearing assembly 90. In one embodiment, the bearing assembly 90 includes a carbon fiber bearing (not shown). Such a carbon fiber bearing does not require a lubricant and does not include moving elements, such as, but not limited to, ball bearings. Thus, in one embodiment, the bearing assembly 90 is a "static bearing assembly." That is, as used herein, a "static bearing assembly" is a bearing assembly that does not require a lubricant and does not include moving elements.

In this configuration, the carriage assembly body 70 is structured to travel generally in a plane and to reciprocate between a retracted, first position and a forward, second position. It is understood that when the carriage assembly body 70 is in the first position, the ram body 50 is in its first position and that, when the carriage assembly body 70 is in the second position, the ram body 50 is in its second position. Thus, the carriage assembly body 70 has an axis of motion 78 that is substantially aligned with the ram body longitudinal axis 56. That is, the carriage assembly body axis of motion 78 may be parallel and spaced from, or be disposed substantially on, the ram body longitudinal axis 56.

Figure 8:
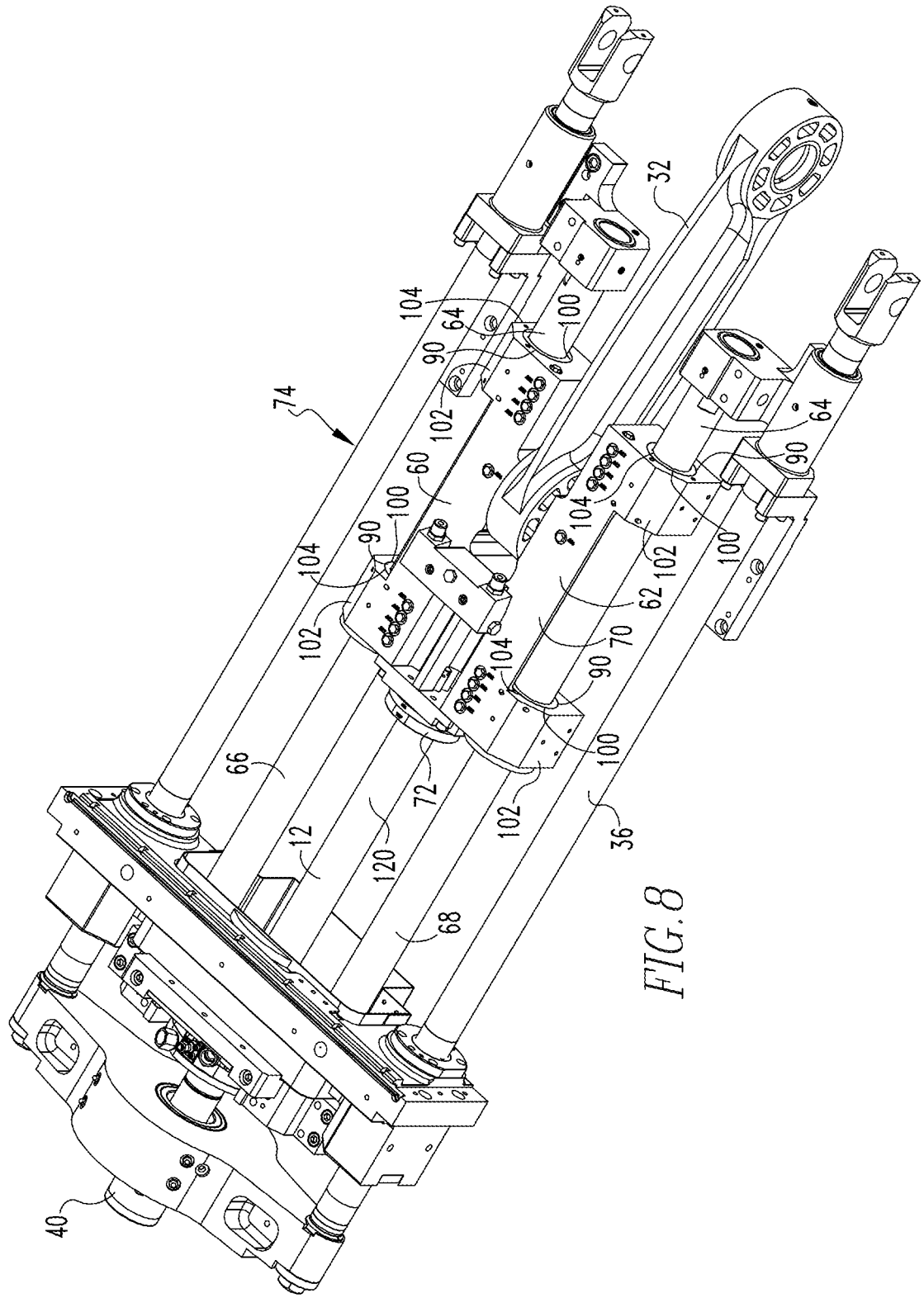
FIG. 8 is an isometric view of an outboard guide bearing assembly.

In another embodiment, shown best in FIGS. 8 and 9, each bearing assembly 90 is a hydrostatic/hydrodynamic bearing assembly 100. As used herein, a "hydrostatic/hydrodynamic bearing assembly" is either a hydrostatic bearing assembly, a hydrodynamic bearing assembly, or a combination thereof. As is known, a hydrostatic/hydrodynamic bearing assembly 100 includes a housing 102 and a bearing 104. The bearing 104 is disposed in the housing 102. The bearing 104 defines a passage 80 though which a journal 64 extends, as discussed above. The hydrostatic/hydrodynamic bearing assembly 100, i.e., the outboard guide bearing assembly 60, further includes a lubricant sump 106, a pump assembly 108 and a plurality of conduits 110, all shown schematically. The hydrostatic/hydrodynamic bearing assembly conduits 110 include conduits extending through the hydrostatic/hydrodynamic bearing assembly housing 102 and bearing 104. As is known, a lubricant, such as, but not limited to oil, is passed through the conduits 110 and disposed between the bearing surface and the journal 64. Alternatively, bearing 104 linear motion rotation draws the fluid onto the inner surface of the bearing 104, forming a lubricating wedge or fluid lift under or around the journal 64.

Because the hydrostatic/hydrodynamic bearing assemblies 100 are, in an exemplary embodiment, separate from the ram body 50, cross contamination cooling liquid and the hydrostatic/hydrodynamic bearing assembly lubricant is greatly minimized. Thus, in an exemplary embodiment, the outboard guide bearing assembly 60 does not include a seal assembly that collects the lubricant and returns the lubricant to the lubricant sump 106 or a filter assembly. Rather, a portion of the housing assembly 11, i.e., the portion below the outboard guide bearing assembly 60, is substantially hollow and defines an enclosed space that acts as the sump 106. In this configuration, lubricant from the journals 64 falls into the sump 106. Further, unlike a ram body 50, the journals 64 are not heated to the point where a cooling fluid is required. Thus, there is no cooling assembly associated with the journals 64 and/or the hydrostatic/hydrodynamic bearing assembly 100. Nor is there a filter assembly associated with the journals 64 and/or the hydrostatic/hydrodynamic bearing assembly 100 as there is no need to separate the lubricant from a cooling fluid.

In an exemplary embodiment, when assembled, the first journal 66 and second journal 68, are horizontally aligned, i.e., in the same general horizontal plane, as noted above. Further, the first journal 66 and second journal 68 extend through the two pair of journal passages 82, 84. Thus, the carriage assembly body 70 is structured to travel in a generally horizontal plane. Further, the ram body 50 is also, in an exemplary embodiment, coupled to, directly coupled to, or fixed to the carriage assembly ram coupling 72. More specifically, the ram body proximal end 52 is coupled to, directly coupled to, or fixed to the carriage assembly ram coupling 72. Further, in an exemplary embodiment, the ram body 50 is disposed in the horizontal plane defined by the first journal 66 and second journal 68. The ram body 50, as well as the carriage assembly body 70, travel, and more specifically reciprocate, in a direction substantially aligned with the ram body longitudinal axis 56. Thus, the carriage assembly ram coupling 72 is structured to support the ram body 50 substantially in the plane of travel.

Utilizing an outboard guide bearing assembly 60 allows the can bodymaker 10 to operate without a seal assembly disposed about the ram body 50, as noted above. Further, the ram body 50 does not pass through a hydrostatic/hydrodynamic bearing assembly or ram guide. Thus, unlike known ram bodies that must have a sufficient length to pass through these elements/assemblies, as well as the die pack 16, the ram body 50 of the exemplary embodiment only needs to have a sufficient length to pass through the die pack 16. This reduction in the length of the ram body 50 reduces the amount of ram droop and thereby reduces the wear and tear on the ram body 50 and the die pack 16. In an exemplary embodiment, the ram body 50 has a length between about 30.0 inches and 32.0 inches, or in another embodiment, a length of about 31.0 inches. That is, the change in size ameliorates the known disadvantages of the known art.

Known ram bodies 50 exist in a number of sizes. The dimensions identified above are associated with one exemplary embodiment, e.g., a ram body 50 sized for standard 12 fluid ounce cans. In the prior art, such a ram body had a length of between about 50 inches to 52 inches when using a 24 inch stroke. Accordingly, it is understood that the disclosed concept allows for a reduction in the length of a ram body of about 40% plus or minus about an inch. Other known ram body lengths include, 45.387 inches, 50.0 inches, 51.0 inches, and 57.0 inches, all plus or minus about an inch. Thus, the disclosed concept also provides for ram bodies (not shown) having lengths of about 27.0 inches, 30.0 inches, and 34.2 inches, all plus or minus about an inch. Alternatively, and stated broadly, a ram body 50 with a reduced length has a length between about 26.0 inches and 36.0 inches, all of which are shorter than known ram body lengths. That is, as used herein, a "reduced length ram body" has a length of between about 26.0 inches and 36.0 inches.

In another exemplary embodiment, shown in FIGS. 11-13 and 19-20, an outboard guide bearing assembly 160 includes a carriage assembly 162 including a body 170 with a ram coupling 172, a crank coupling 174, and a number of guide bearing assemblies 180, as well as a pump assembly 108 and a plurality of conduits 110 as before. As before, the carriage assembly guide bearing assemblies 180 are separated from the ram body 50. That is, as before, the carriage assembly body 170 is, in an exemplary embodiment, generally rectangular and includes a forward, axial surface 171, a first lateral surface 173, and a second lateral surface 175. The ram coupling 172 is disposed on the carriage assembly body forward, axial surface 171, i.e., the forward surface through which the axis of motion passes. The ram coupling 172 is structured to support the ram body 50 in a substantially horizontal orientation. As before, the carriage assembly body 170 is structured to travel generally in a plane and to reciprocate between a retracted, first position and a forward, second position.

The carriage assembly guide bearing assemblies 180, in an exemplary embodiment, include two carriage assembly guide bearing assemblies 180; a carriage assembly first guide bearing assembly 180A, and a carriage assembly second guide bearing assembly 180B. In an exemplary embodiment, the carriage assembly first guide bearing assembly 180A is disposed on, and coupled to, the carriage assembly body first lateral surface 173, and, the carriage assembly second guide bearing assembly 180B is disposed on, and coupled to, the carriage assembly body second lateral surface 175. It is further understood that elements of the carriage assembly first and second guide bearing assemblies 180A, 180B are also coupled to the bodymaker housing assembly 11, as described below. It is noted that, with the ram body 50 coupled to the carriage assembly body forward, axial surface 171 and the carriage assembly first and second guide bearing assemblies 180A, 180B coupled to the carriage assembly body first and second lateral surfaces 173, 175, the carriage assembly guide bearing assemblies 180A, 180B are separated from the ram body 50.

As the carriage assembly first and second guide bearing assemblies 180A, 180B are substantially similar, only one will be described. It is understood, however, that each carriage assembly guide bearing assembly 180A, 180B includes the elements described hereinafter and such elements associated with the carriage assembly first guide bearing assembly 180A are identified by the reference letter "A" and elements associated with the carriage assembly second guide bearing assembly 180B are identified by the reference letter "B," even when that indication is not provided with the initial description of the elements. Further, hereinafter, the names of components of each carriage assembly guide bearing assembly 180 may be shortened to "first [X]" and "second [X]." For example, in an exemplary embodiment, the carriage assembly first and second guide bearing assemblies 180A, 180B each include a saddle 186, described below. A saddle 186 may thereafter be identified as a "first saddle 186A" or a "second saddle 186B"; it is understood that the term "first" and "second" identify the carriage assembly guide bearing assembly 180 with which the component is associated.

In an exemplary embodiment, a carriage assembly guide bearing assembly 180 includes a first component 182 and a second component 184. The carriage assembly guide bearing assembly first component 182 is a saddle 186 and the carriage assembly guide bearing assembly second component 184 is a journal channel 188. That is, as used herein, a journal channel 188 is a channel that defines a path of travel, similar to the journals 66, 68 described above. Further, as used herein, a "saddle" is a construct sized to substantially correspond to the associated channel 188. That is, the saddle 186 has a similar, but slightly smaller, cross-sectional shape as the channel 188, and, a reduced longitudinal dimension. In this configuration, the saddle 186 is structured to travel through the channel 188. In an exemplary embodiment, each saddle 186 is unitary with the carriage assembly body 170.

Figure 12:
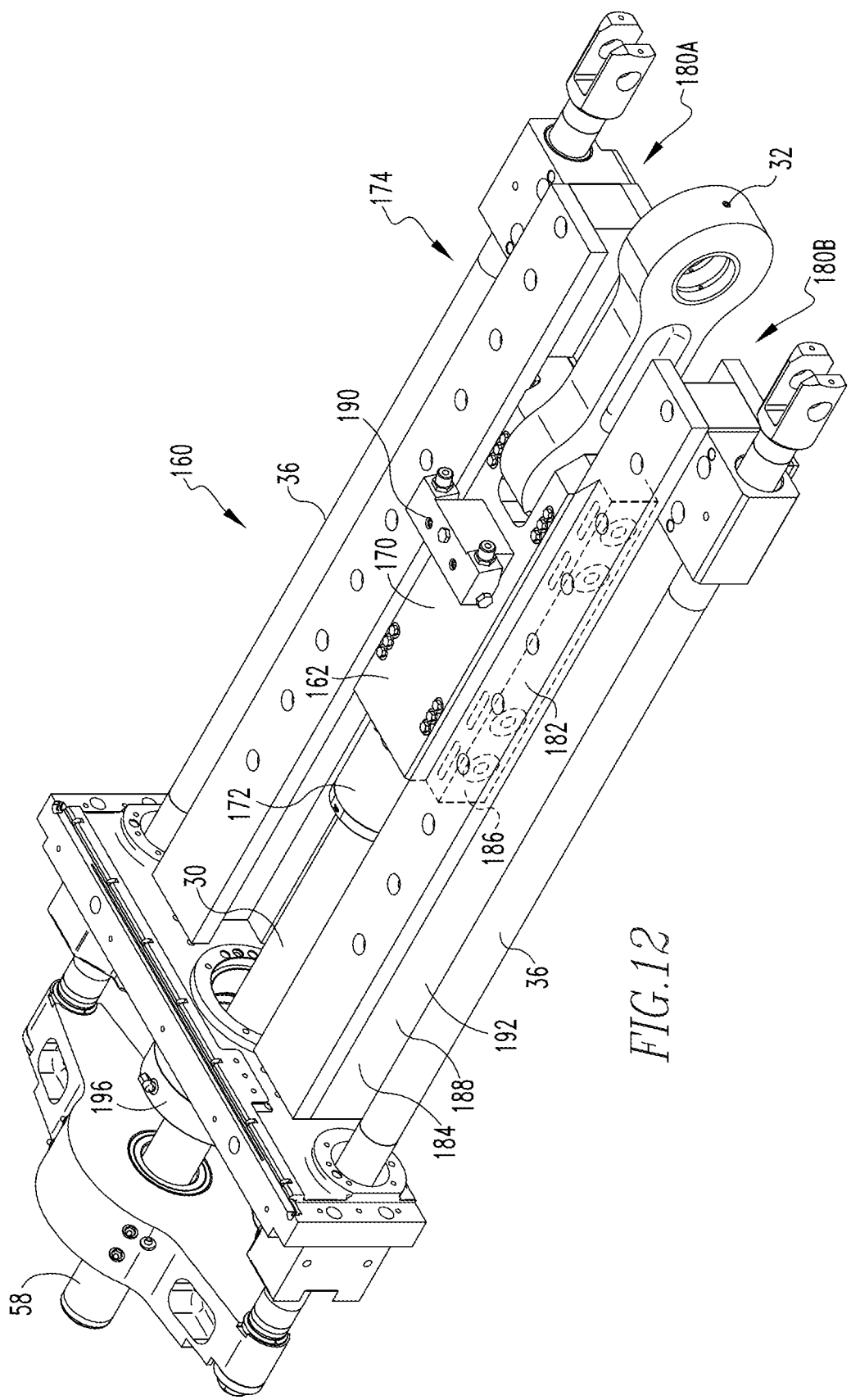
FIG. 12 is a second isometric view of another embodiment of an outboard guide bearing assembly.

In an exemplary embodiment, the journal channel 188 is formed of a number of generally planar surfaces forming a generally square C-shaped channel. That is, the channel 188 has a generally rectangular cross-section. Accordingly, the corresponding saddle 186 has a generally rectangular cross-section as well. Further, as shown in FIG. 12, in an exemplary embodiment, saddle 186 is a generally parallelepiped construct. In an alternate embodiment, not shown, the channel 188 and the saddle 186 have a trapezoidal cross-sectional shape.

Further, in an exemplary embodiment, the carriage assembly guide bearing assembly 180 is a hydrostatic/hydrodynamic bearing assembly. In this embodiment, the bearing assembly first component 182 is structured to be coupled to, and in fluid communication with, a lubricant sump 106. That is, the saddle 186 includes a number of fluid ports 190 that are coupled to, and in fluid communication with, the lubricant sump 106. As before, a plurality of conduits 110 provide fluid communication for a lubricant and allow the lubricant to be pumped by pump assembly 108 from the sump 106 through the fluid ports 190. The plurality of conduits 110, in an exemplary embodiment, pass through the carriage assembly body 170. In this configuration, a layer of lubricant is disposed between the carriage assembly guide bearing assembly first component 182 and the carriage assembly guide bearing assembly second component 184.

In an exemplary embodiment, the carriage assembly guide bearing assembly second component 184 includes a gib assembly 192. A gib assembly 192 includes a number, typically two, generally parallel planar members (not shown) coupled by spaced, adjustable coupling components, such as but not limited to, threaded rods (not shown). The relative spacing and angle of the planar members can be adjusted by actuating the adjustable coupling components.

For example, if a journal channel 188 is a generally square C-shaped channel having three generally planar surfaces, each planar surface may be formed by a gib assembly 192. That is, one of each gib assembly 192 planar members forms each of the square C-shaped channel planar surface. In this configuration, the characteristics, e.g., alignment of the channel surfaces or cross-sectional area of the journal channel 188, can be adjusted.

In an exemplary embodiment, the carriage assembly guide bearing assembly 180 is structured to orient the ram body 50, or the punch 58, with the passage through the die pack 16. To be "structured to orient the ram body," with the longitudinal axis of the die pack passage 17 as used herein, means to be structured to alter the orientation of a ram body, or a punch, in a manner intended to position the longitudinal axis of the ram body 50 in line with the axis of the die pack 16 whereby the ram body 50 does not need to be supported by a guide bearing. Orienting the ram body 50 reduces the misalignment of the punch 58 and the die pack 16 and dampens the "wobble," described above. That is, a prior art bearing assembly, including a hydrostatic/hydrodynamic bearing assembly, has an effect on the orientation of the associated ram body 50 or punch 58, but other assemblies, such as but not limited to, a guide assembly substantially controlled the orientation of the ram body 50 or punch 58. That is, a hydrostatic/hydrodynamic bearing assembly 100 has a compensating effect. For example, on a carriage assembly body 170 including a hydrostatic/hydrodynamic bearing assembly 100, any offset in the carriage assembly 62 relative to the channels 188 will narrow the gap between the carriage assembly guide bearing assembly first component 182 and the carriage assembly guide bearing assembly second component 184 at one location and increase the gap at another location. This change in the gap changes the fluid pressure at those locations, i.e., increasing the pressure where the gap is narrowed and decreasing the pressure where the gap is increased. This, in turn, causes the carriage assembly 62 to be reoriented so as to balance the pressure. The compensating effect of hydrostatic/hydrodynamic bearing assemblies of the prior art, wherein the pads are disposed adjacent each other, as shown in FIG. 1, is not, as used herein, "structured to orient the ram body."

Stated alternately, various characteristics, such as but not limited to manufacturing tolerances, of a prior art bearing assembly, including a hydrostatic/hydrodynamic bearing assembly and the location of the hydrostatic/hydrodynamic fluid bearing assemblies immediately adjacent each other, allowed the ram body or punch to wobble relative to the bodymaker housing assembly; thus prior art hydrostatic/hydrodynamic fluid bearing assemblies required a ram guide. To be "structured to orient the ram body," as used herein, means that the guide bearing assembly substantially controls the orientation of the ram body 50 or punch 58. To substantially control the orientation of the ram body 50 or punch 58, a bearing assembly, including a guide bearing assembly 180, must control the orientation of the ram body 50 or the punch 58 in an intended manner as a result of more than the compensating effect discussed above. To "control the orientation of the ram body or punch" (50, 58) as used herein, means that the hydrostatic/hydrodynamic bearing assembly 100 includes the following characteristics: (1) the fluid producing elements of the carriage assembly guide bearing assemblies 180 are "sufficiently spaced" so as to alter the orientation of a ram body 50, or a punch 58, in a manner intended to position the longitudinal axis of the ram body 50 to move over a selected path of travel, and (2) the carriage assembly guide bearing assemblies 180 "produce a sufficient, but reasonable, amount of fluid to establish an aligning fluid bearing stiffness." As discussed below, and in an exemplary embodiment, the fluid producing elements of the carriage assembly guide bearing assemblies 180 are thrust pad assemblies 400.

As used herein, "produce" means to pass fluid through the pump assembly 108, the plurality of conduits 110, and the carriage assembly guide bearing assemblies 180. That is, "produce" does not mean "create." Further, "produce" means to pass fluid through the pump assembly 108, the plurality of conduits 110, and the carriage assembly guide bearing assemblies 180 at a sufficient volume of bearing fluid so that the bearing fluid acts to stiffen, i.e., make more rigid, the guide bearing assembly 180. Thus, with regard to "produc[ing] a sufficient, but reasonable, amount of fluid to establish an aligning fluid bearing stiffness," it is understood that the fluid disposed between the guide bearing assembly first component 182 and second component 184 is at a sufficient pressure to effectively eliminate the wobble of the ram body 50 or punch 58 relative to the bodymaker housing assembly 11 and to align the longitudinal axis of the ram body 50 with the axis of the die pack 16. This is not possible with hydrostatic/hydrodynamic fluid bearing assemblies 100 in every configuration. By way of an impossible example, if a hydrostatic/hydrodynamic bearing assembly 100 including a pump and the hydrostatic/hydrodynamic fluid bearing assemblies 100, shown in FIG. 1 (and which are immediately adjacent each other), were structured to provide a nearly infinite fluid flow rate, then such a hydrostatic/hydrodynamic bearing assembly could produce an amount of fluid to establish an aligning fluid bearing stiffness. A nearly infinite fluid flow rate, however, is not "reasonable" as it is understood that the fluid flow characteristics of a pump assembly 108, any conduits 110, and the hydrostatic/hydrodynamic fluid bearing assemblies 100 are limited by physics and present technology. Accordingly, to "produce a sufficient, but reasonable, amount of fluid to establish an aligning fluid bearing stiffness" as used herein means that the fluid in the bearing assembly is at a sufficient pressure to effectively eliminate the wobble of the ram body 50, or punch 58, relative to the bodymaker housing assembly 11 using components known to those of skill in the art. Thus, a hydrostatic/hydrodynamic bearing assembly that is ostensibly "capable" of "establishing an aligning fluid bearing stiffness" if given, for example, a nearly infinite fluid flow rate is not "structured to orient the ram body" because such an imaginary hydrostatic/hydrodynamic bearing assembly does not "produce a sufficient, but reasonable, amount of fluid to establish an aligning fluid bearing stiffness." That is, an infinite fluid flow is not "reasonable." Further, and to be clear, hydrostatic/hydrodynamic fluid bearing assemblies 100 which are immediately adjacent each other, as shown in FIG. 1, as used herein, cannot "produce a sufficient, but reasonable, amount of fluid to establish an aligning fluid bearing stiffness."

Figure 22A:
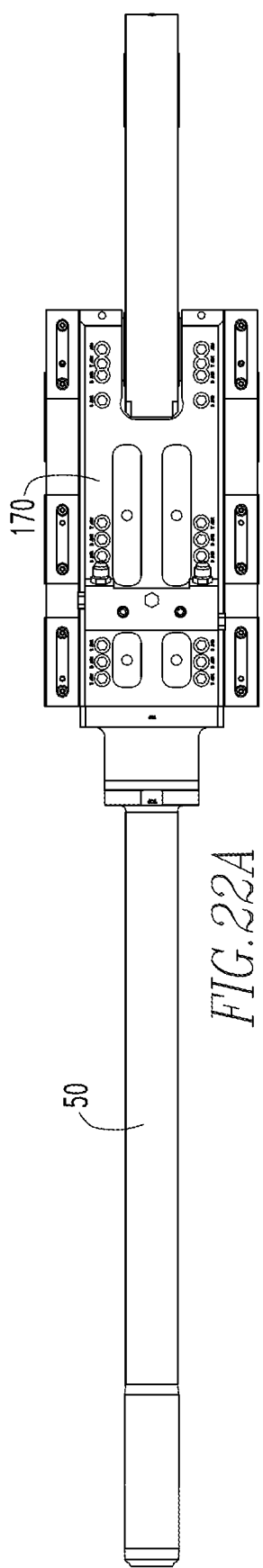
FIG. 22A is a top view of a ram assembly indicating the center of gravity of the ram assembly.
Figure 22B:
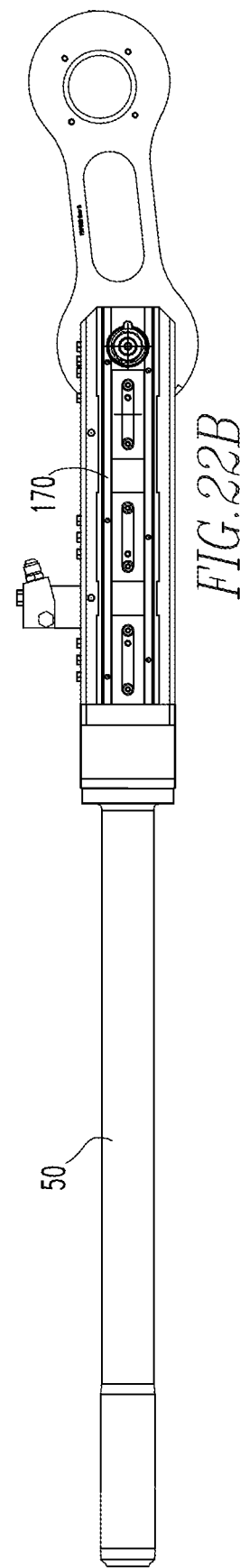
FIG. 22B is a side view of a ram assembly indicating the center of gravity of the ram assembly.
Figure 22C:
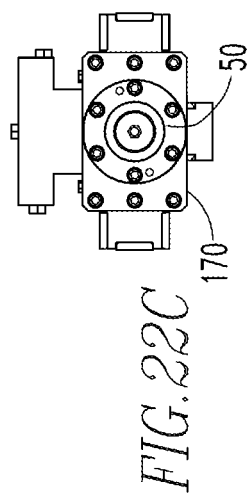
FIG. 22C is a front view of a ram assembly indicating the center of gravity of the ram assembly.

Further, "sufficiently spaced" as used herein with respect to carriage assembly guide bearing assemblies 180, means that the carriage assembly guide bearing assemblies 180 are not immediately adjacent each other. It is understood that the ability of the guide bearing assemblies 180 to orient the ram body 50, or the punch 58, with the passage through the die pack 16 is a function of the fluid pressure between the carriage assembly guide bearing assembly first component 182 and the carriage assembly guide bearing assembly second component 184, as discussed above, as well as the spacing of the carriage assembly guide bearing assemblies 180, and the distance of the guide bearing assemblies 180 from the center of gravity of the ram assembly 12. Other characteristics of the ram assembly 12 also affect the orientation, but to a lesser and, as used herein, a negligible extent. As shown in FIGS. 22A-22C, the center of gravity of the ram assembly 12 is located at the interface of the ram body 50 and the carriage assembly body 170 at about the ram body longitudinal axis 56. It is understood that the further a carriage assembly guide bearing assembly 180 is spaced from the center of gravity of the ram assembly 12 the greater affect the fluid passing through a thrust pad assembly 400, discussed below, has on the position of the ram body 50. That is, the further a thrust pad assembly 400 is from the center of gravity of the ram assembly 12, the greater the lever arm. Thus, to "produce a sufficient, but reasonable, amount of fluid to establish an aligning fluid bearing stiffness" also depends upon the location of the thrust pad assemblies 400 relative to the center of gravity of the ram assembly 12. Further, as used herein, to be "sufficiently spaced" means that the thrust pad assemblies 400 are spaced so that, for the amount of fluid produced by the thrust pad assemblies 400, the thrust pad assemblies 400, i.e., the carriage assembly guide bearing assemblies 180, are structured to alter the orientation of a ram body 50, or a punch 58, in a manner intended to position the longitudinal axis of the ram body 50 to move over a selected path of travel. Thus, with "sufficiently spaced" thrust pad assemblies 400, a known pump assembly 108 and a known conduits 110 can "produce a sufficient, but reasonable, amount of fluid to establish an aligning fluid bearing stiffness." Thus, having "sufficiently spaced" thrust pad assemblies 400 solves the stated problem relating to the "wobble" noted above.

For example, and in general terms, with a relatively short ram assembly 12, lesser force is required to orient the ram body 50, or the punch 58, with the passage through the die pack 16. Thus, the carriage assembly guide bearing assemblies 180 may be moderately spaced and the outboard guide bearing assembly 160 is structured to produce a moderate amount of guide fluid. Moreover, the amount of fluid produced at a thrust pad assembly 400 relatively near the center of gravity of the ram assembly 12 is greater than the amount of fluid produced at a thrust pad assembly 400 relatively far from the center of gravity of the ram assembly 12.

If, with the same relatively short ram assembly 12, the spacing of the carriage assembly guide bearing assemblies 180 was increased, i.e., if the rear thrust pad assembly 400 was even further from the center of gravity of the ram assembly 12, the outboard guide bearing assembly 160 is structured to produce a lesser amount of guide fluid. Conversely, with a relatively long ram assembly 12, the carriage assembly guide bearing assemblies 180 would need to have a greater spacing and the outboard guide bearing assembly 160 would need to produce a greater amount of guide fluid when compared to the outboard guide bearing assembly 160 supporting the relatively short ram assembly 12.

Thus, a guide bearing assembly 180 that is "structured to orient the ram body 50" is a guide bearing assembly 180 that "produce[s] a sufficient amount of fluid to establish an aligning fluid bearing stiffness," and, wherein the fluid producing elements of the carriage assembly guide bearing assemblies 180 are "sufficiently spaced" from each other. Thus, the reverse is also true, i.e., a guide bearing assembly 180 that "produce[s] a sufficient amount of fluid to establish an aligning fluid bearing stiffness" and wherein the fluid producing elements of the carriage assembly guide bearing assemblies 180 are "sufficiently spaced" is "structured to orient the ram body 50."

Further, as noted above, to be "structured to [verb or 'be an [X]']" the construct must be intended to, and is designed to, perform the identified verb or to be an [X]. Thus, as used herein, a lubricated bearing assembly that merely uses a lubricating fluid is not "structured to orient the ram body 50" unless specifically described as doing so. Stated alternately, a prior art bearing assembly that is possibly capable of altering the orientation of a ram body 50, or a punch 58, in an intended manner is not, as used herein, "structured to orient the ram body" and does not "produce a sufficient amount of fluid to establish an aligning fluid bearing stiffness" and does not include fluid producing elements of the carriage assembly guide bearing assemblies 180 that are "sufficiently spaced." To be "structured to orient the ram body 50" and "produce a sufficient amount of fluid to establish an aligning fluid bearing stiffness," and which includes fluid producing elements of the carriage assembly guide bearing assemblies 180 that are "sufficiently spaced," a guide bearing assembly 180 must be described as being able to orient the ram body 50 or must be designed to or be shown to intentionally orient the ram body 50.

Figure 21:
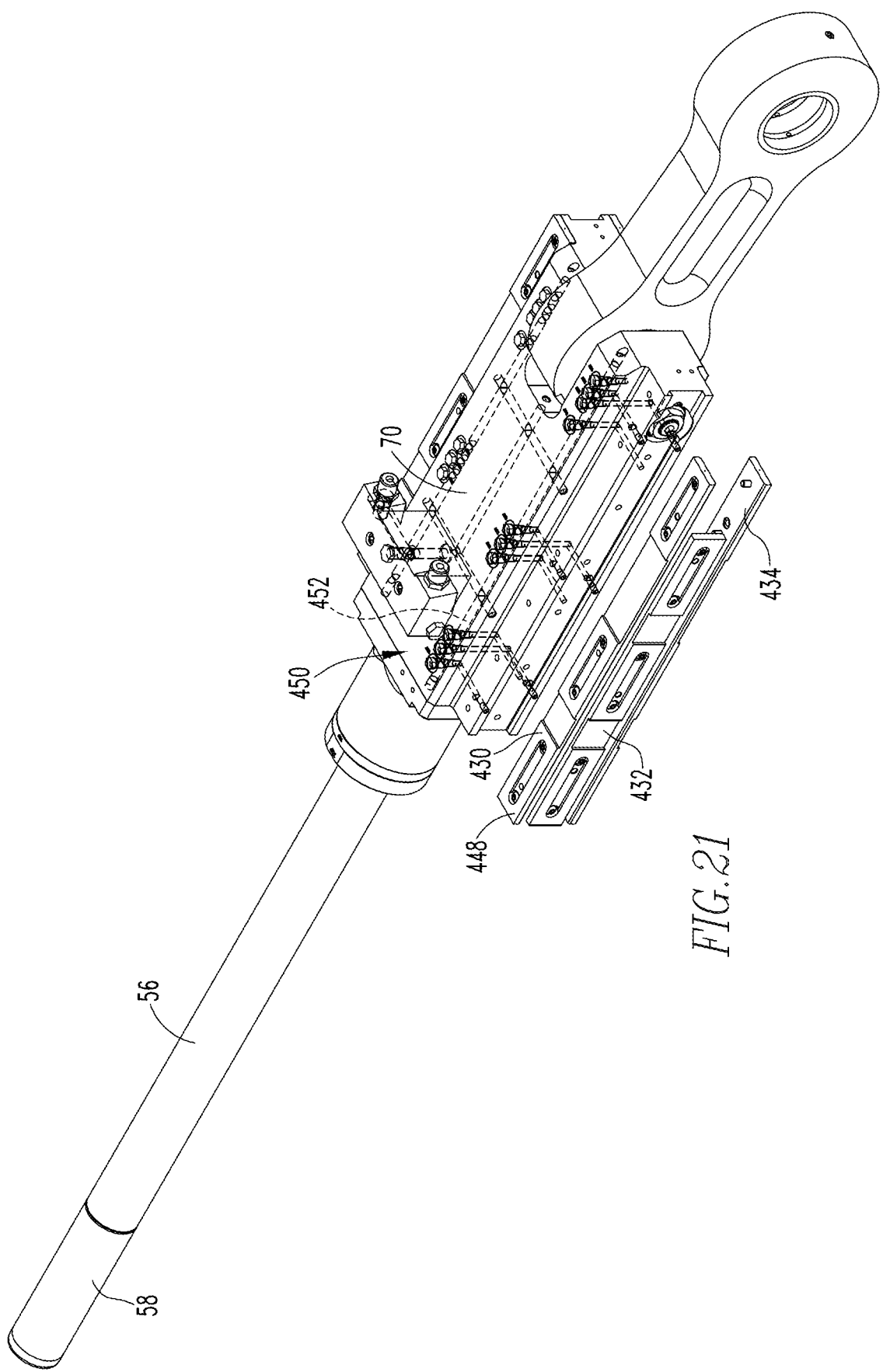
FIG. 21 is an isometric exploded view of an alternate embodiment.

It is again noted that the carriage assembly first and second guide bearing assemblies 180A, 180B are substantially similar, only one will be described. It is understood, however, that each carriage assembly guide bearing assembly 180A, 180B includes the elements described hereinafter. In an exemplary embodiment, shown in FIGS. 19-21, each saddle 186 includes a number of thrust pad assemblies 400. As described below, a unitary body component may extend over separate thrust pad assemblies 400; the thrust pad assemblies 400, however, are still separate and distinct assemblies. In an exemplary embodiment, the saddle 186 has a generally rectangular cross-section, i.e., a parallelepiped cross-section; thus, each saddle 186 has an upper surface 181, an outer lateral surface 183, and a lower surface 185. In this configuration, each thrust pad assembly 400 includes an upper pad portion 402, a lateral pad portion 404, and a lower pad portion 406. The upper pad portion 402 is disposed on the saddle upper surface 181. The lateral pad portion 404 is disposed on the saddle outer lateral surface 183. The lower pad portion 406 is disposed on the saddle lower surface 185.

Each pad portion 402, 404, 406 is substantially similar and only one will be described. A pad portion 402, 404, 406 includes a generally planar pad body 410. Each pad portion body 410, in an exemplary embodiment, defines a recessed slot 412. Within the pad portion body slot 412 is a fluid passage 414 and a number of coupling passages (not shown). Each pad portion body fluid passage 414 is structured, i.e., positioned, to align with a fluid distribution assembly passage 452, described below.

In an exemplary embodiment, each saddle 186 includes a forward thrust pad assembly 400', at least one medial thrust pad assembly 400", and a rear thrust pad assembly 400'". It is noted that the inclusion of at least one medial thrust pad assembly 400" in excess of the forward thrust pad assembly 400' and the rear thrust pad assembly 400'", i.e., each additional medial thrust pad assembly 400", provides for additional orienting forces and a better ability to provide a resulting counteracting moment to any offsetting forces, as described above. Moreover, the addition of at least one medial thrust pad assembly 400" means that the burden of "produc[ing] a sufficient, but reasonable, amount of fluid to establish an aligning fluid bearing stiffness" is divided among additional thrust pad assemblies. That is, current technology pump assemblies 108 and conduits 110 are insufficient to "produce a sufficient, but reasonable, amount of fluid to establish an aligning fluid bearing stiffness" in insufficiently spaced thrust pad assemblies; that is, for example, the required fluid pressure is unobtainable or would burst the conduits. By including at least one medial thrust pad assembly 400'', this required fluid pressure is reduced so that current technology pump assemblies 108 and conduits 110 are sufficient to "produce a sufficient, but reasonable, amount of fluid to establish an aligning fluid bearing stiffness." Thus, the inclusion of at least one medial thrust pad assembly 400'' solves the stated problem relating to the "wobble" noted above.

Figure 19:
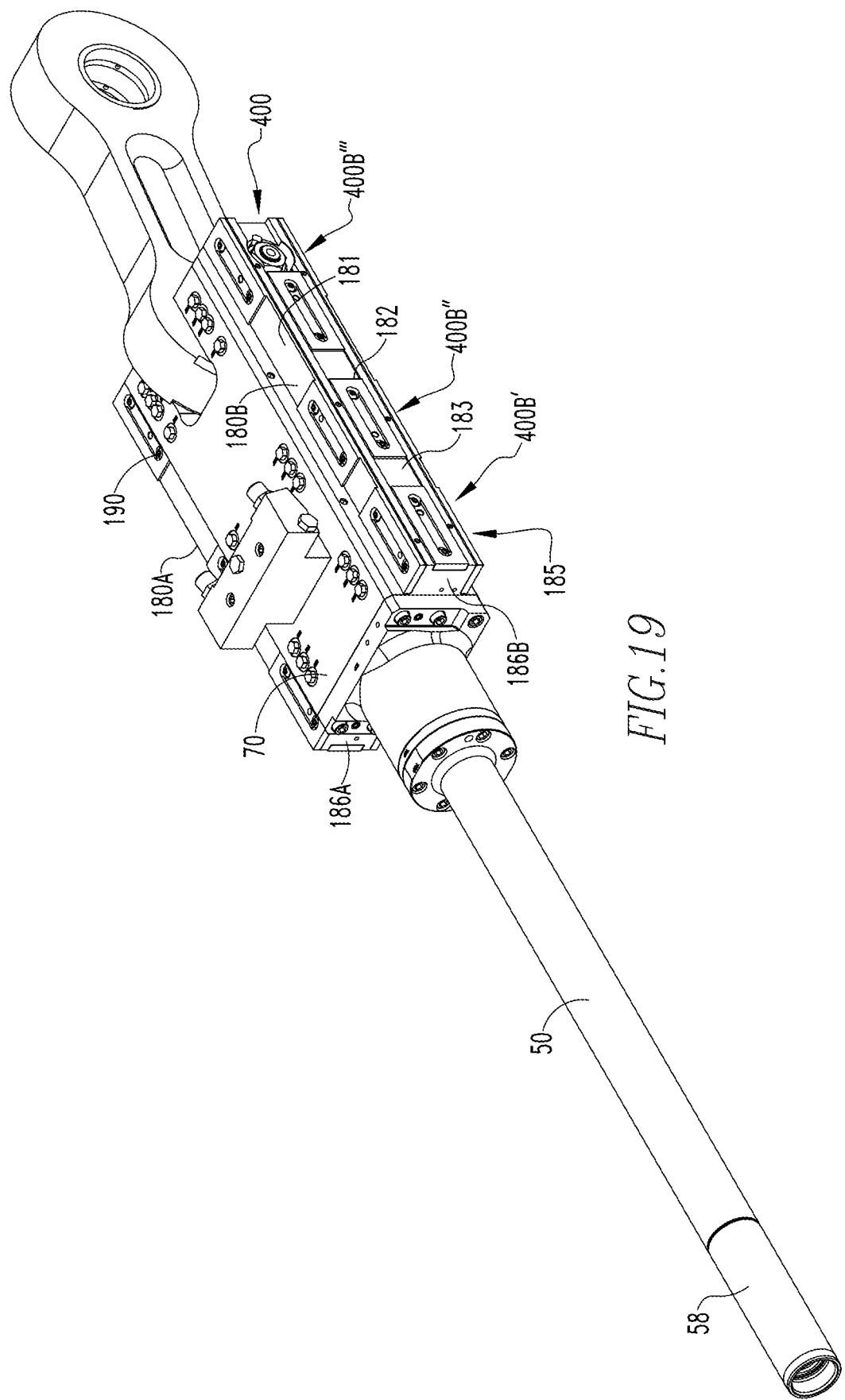
FIG. 19 is an isometric view of an alternate embodiment.
Figure 20:
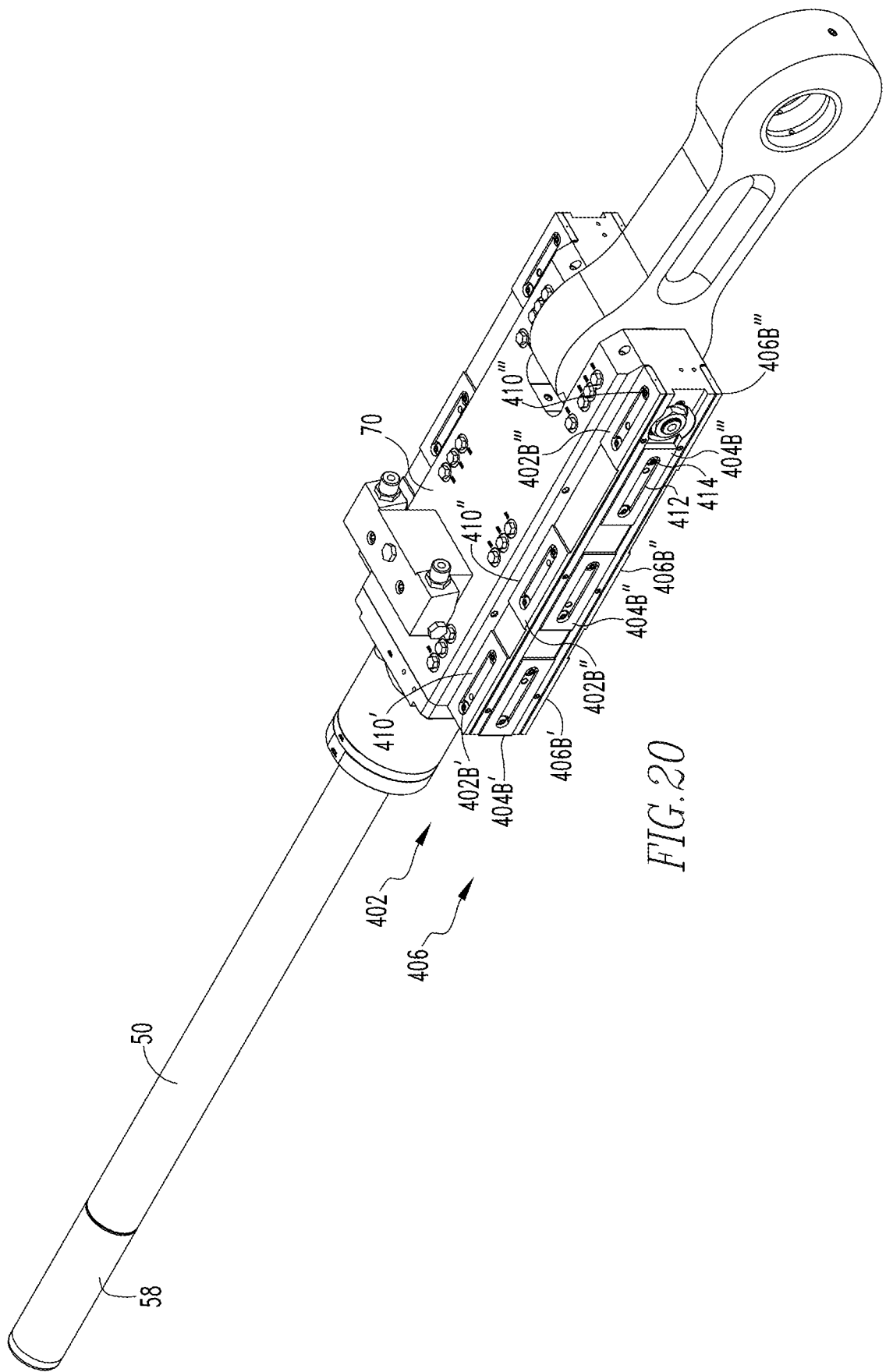
FIG. 20 is another isometric view of an alternate embodiment.

It is understood that three thrust pad assemblies 400', 400'', 400''' are exemplary only and each saddle 186 may include any number of thrust pads so long as that number is greater than one and so long as the trust pads 400 are "sufficiently spaced" from each other as defined above. As shown, and in an exemplary embodiment, there is one medial thrust pad assembly 400''. Hereinafter, the number of "'" marks indicate components of the separate pad assemblies 400', 400'', 400'''. As shown in FIG. 19, in each forward thrust pad assembly 400' and medial thrust pad assembly 400'', the upper pad portions 402', 402'', lateral pad portions 404', 404'', and lower pad portions 406', 406'' are generally aligned. That is, for example, the forward edge and rear edge of each pad portion body 410 in each forward thrust pad assembly 400' and medial thrust pad assembly 400'' are disposed generally in the same plane. In the rear thrust pad assembly 400''', the upper pad portion 402''' and lower pad portion 406''' are longitudinally offset from the lateral pad portion 404'''. In this configuration, the pin 33 coupling the crank assembly crank arm 32 to the carriage assembly body 170 is disposed between the upper pad portion 402''' and lower pad portion 406'''.

In an exemplary embodiment, the forward thrust pad assembly 400', the at least one medial thrust pad assembly 400'', and the rear thrust pad assembly 400''' share a number of unitary pad members 430, 432, 434. That is, each carriage assembly guide bearing assembly 180 includes a unitary upper pad member 430, a unitary lateral pad member 432, and a unitary lower pad member 434. The unitary upper pad member 430 includes an elongated, generally planar unitary body 448 that defines the forward thrust pad assembly upper pad portion 402', the medial thrust pad assembly upper pad portion 402'', and the rear thrust pad assembly upper pad portion 402'''. That is, the generally planar upper pad member 430 includes recesses, i.e., thinner portions of the pad member body 448 thereby defining the thicker portions as the various pad portion bodies 410. Similarly, the unitary lateral pad member 432 defines the forward thrust pad assembly lateral pad portion 404', the medial thrust pad assembly lateral pad portion 404'', and the rear thrust pad assembly lateral pad portion 404''', and the unitary lower pad member 434 defines the forward thrust pad assembly lower pad portion 406', the medial thrust pad assembly lower pad portion 406'', and the rear thrust pad assembly lower pad portion 406'.

In an exemplary embodiment, each carriage assembly guide bearing assembly 180 includes a fluid distribution assembly 450 structured to provide a balanced fluid flow to associated saddle thrust pad assemblies 400. Thus, each saddle 186, i.e., each fluid distribution assembly 450, includes a number of passages 452. Each fluid distribution assembly passage 452 is structured to be coupled to, and in fluid communication with a pad body fluid passage 414 as well as the lubricant sump 106. In this configuration, lubricant is transferred to the carriage assembly guide bearing assembly 180.

Further, the fluid distribution assembly passages 452 are structured to "provide a balanced fluid flow" to associated saddle thrust pad assemblies 400. As used herein, to "provide a balanced fluid flow" means that the fluid distribution assembly passages 452 provide sufficient fluid flow to the associated portions 402, 404, 406 so that the carriage assembly guide bearing assembly 180 "produce[s] a sufficient amount of fluid to establish an aligning fluid bearing stiffness," as defined above, and to produce fluid at a rate so that the fluid pressure at each fluid port 190 is generally equivalent. Thus, it is understood that the configuration of the fluid distribution assembly passages 452 depends upon the weight and configuration of the bodymaker 10 and the ram assembly 12. It is noted that to be structured to "provide a balanced fluid flow" a fluid distribution assembly must be described as being able to "provide a balanced fluid flow" or must be designed or shown to intentionally "provide a balanced fluid flow." That is, a fluid distribution assembly that merely provides a fluid flow does not "provide a balanced fluid flow" as used herein, unless the fluid distribution assembly is described as being able to "provide a balanced fluid flow" or is designed to or is shown to intentionally "provide a balanced fluid flow."

Further, a number of the fluid distribution assembly fluid passages 452 are selectively closable. For example, a number of the individual fluid distribution assembly fluid passages 452 are structured have a plug (not shown) installed therein. The plug seals the individual fluid distribution assembly fluid passage 452. In an exemplary embodiment, the plug is disposed on the carriage assembly body 170 at the opening structured to interface with the conduit 110 to the sump 106. Alternatively, a plug may be disposed in a pad body fluid passage 414. In another embodiment, not shown, a number of the fluid distribution assembly fluid passages 452 include a valve assembly (not shown) that moves between an open position and a closed position.

In this configuration, the first and second saddles 186A, 186B are structured to produce a sufficient amount of fluid to establish an aligning fluid bearing stiffness. That is, as used herein, the first and second saddles 186A, 186B with a forward thrust pad assembly 400', at least one medial thrust pad assembly 400'', and a rear thrust pad assembly 400''', wherein the thrust pad assemblies 400', 400'', 400''' are coupled to, and in fluid communication with, a fluid distribution assembly passages 452 structured to "provide a balanced fluid flow" and to produce a sufficient amount of fluid to establish an aligning fluid bearing stiffness.

In this embodiment, the housing assembly 11 may, and as shown does, include a seal assembly 196 for the ram body 50. That is, the seal assembly 196 includes two cup seals, not shown, as is known. That is, one cup seal is structured to remove coolant from the ram body 50 as the ram body travels to the second position to the first position, and, the other cup seal is structured to remove lubricant from the ram body 50 as the ram body 50 travels from the first position to the second position. It is noted that the seal assembly 196 is not a bearing assembly and does not support the ram body 50 and, therefore, does not change the "cantilever length" of the ram body 50, as discussed below.

In this embodiment, unlike known ram bodies that must have a sufficient length to pass through a bearing assembly, the ram body 50 of this exemplary embodiment only needs to have a sufficient length to pass through the seal assembly 196 and the die pack 16. This reduction in the length of the ram body 50 reduces the amount of ram droop and thereby reduces the wear and tear on the ram body 50 and the die pack 16. In an exemplary embodiment, the ram body 50 has a length of between about 33.0 inches to about 36.0 inches, or about 34.5 inches. That is, the change in size ameliorates the disadvantages of the known art.

Figure 3:
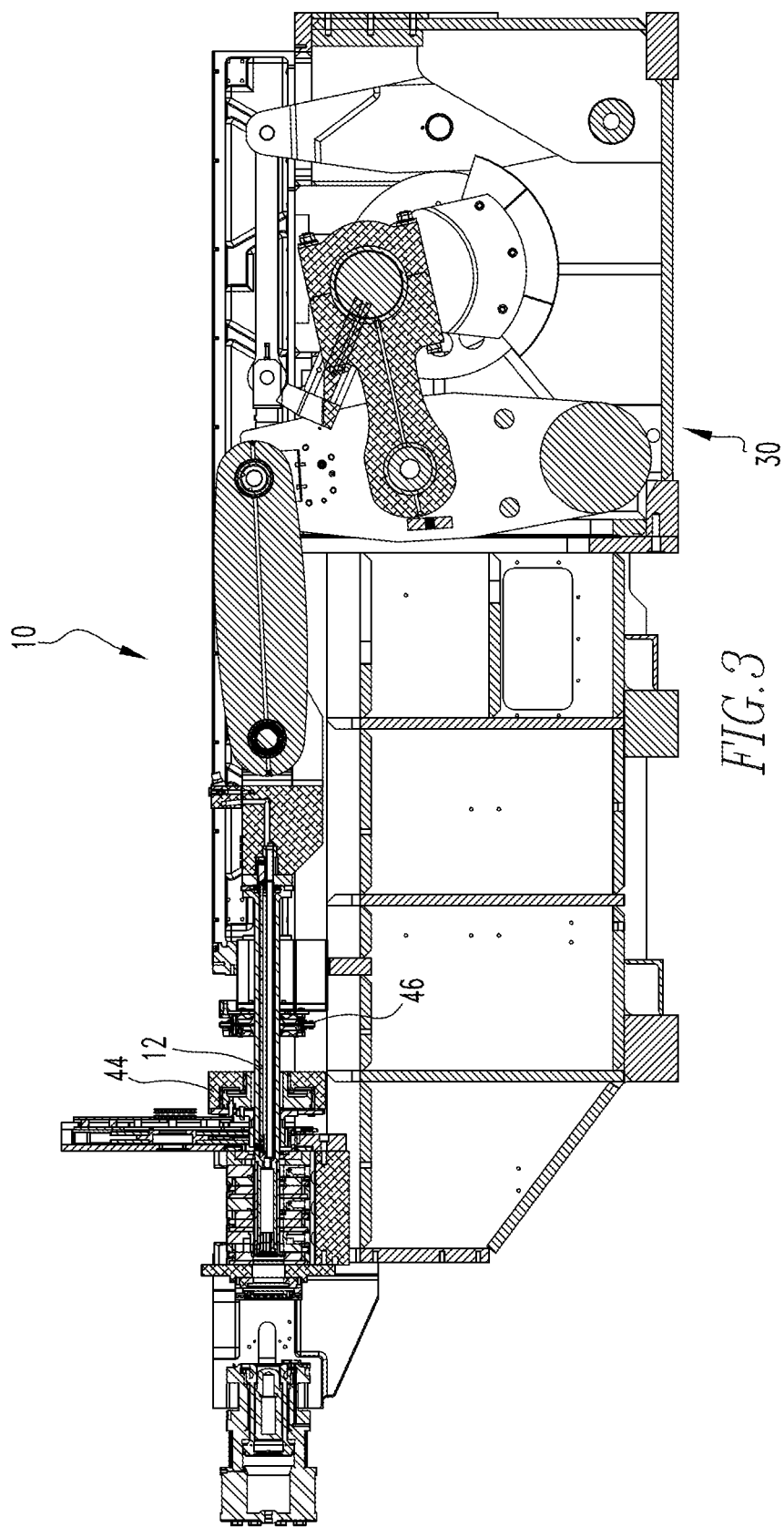
Figure 4:
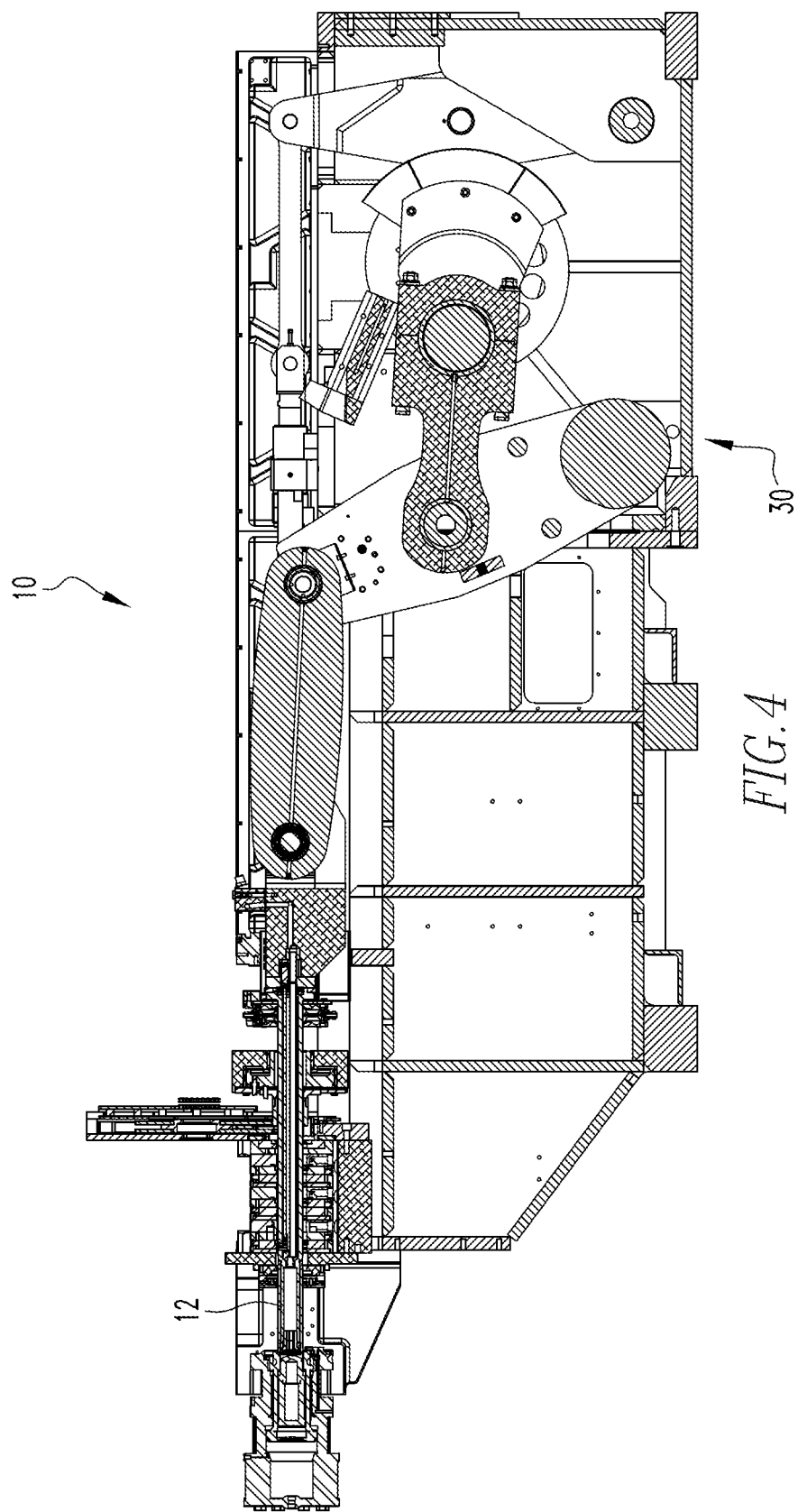
Figure 5:
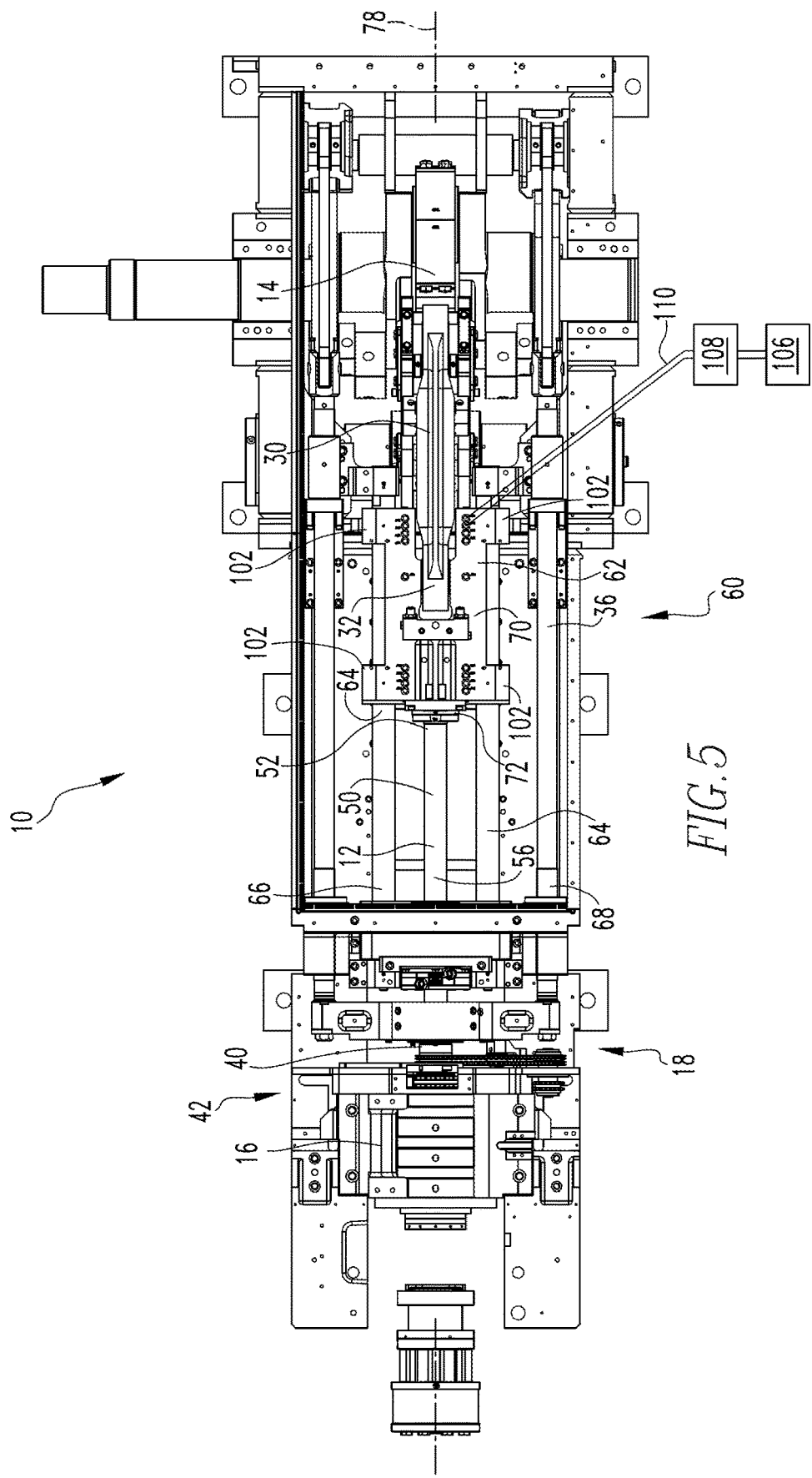
FIGS. 5, 6, and 7 show a top view of a bodymaker with the ram assembly in a first position, an intermediate position, and a second position, respectively.
Figure 6:
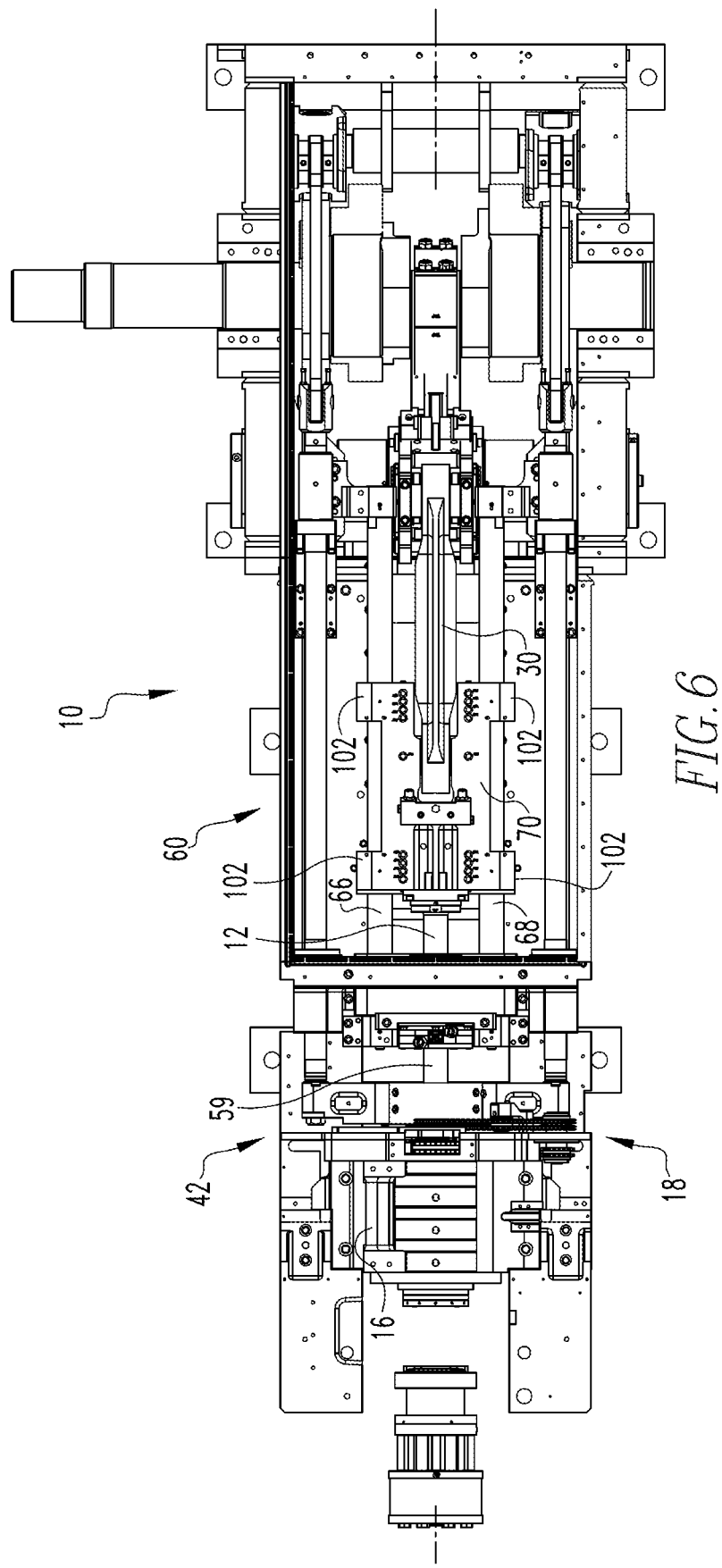
Figure 7:
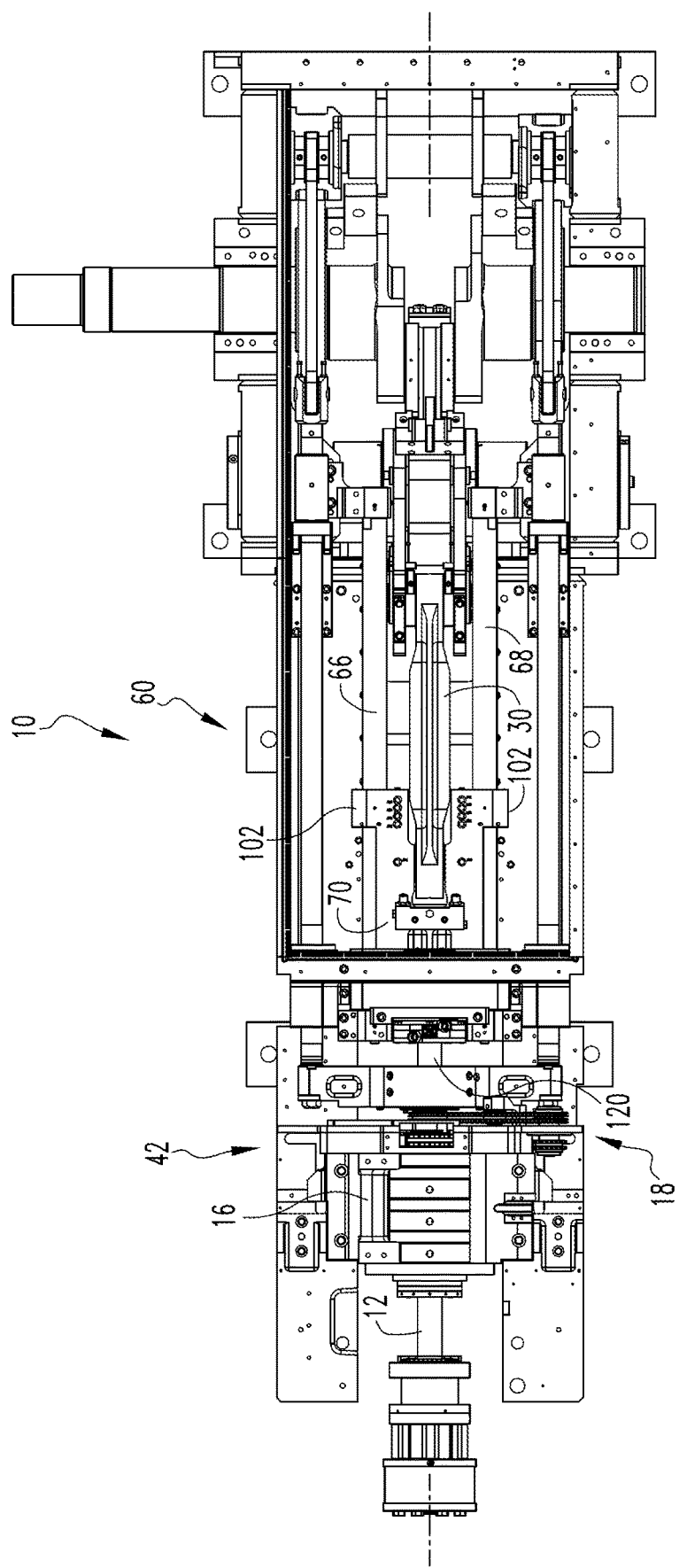
Figure 13:
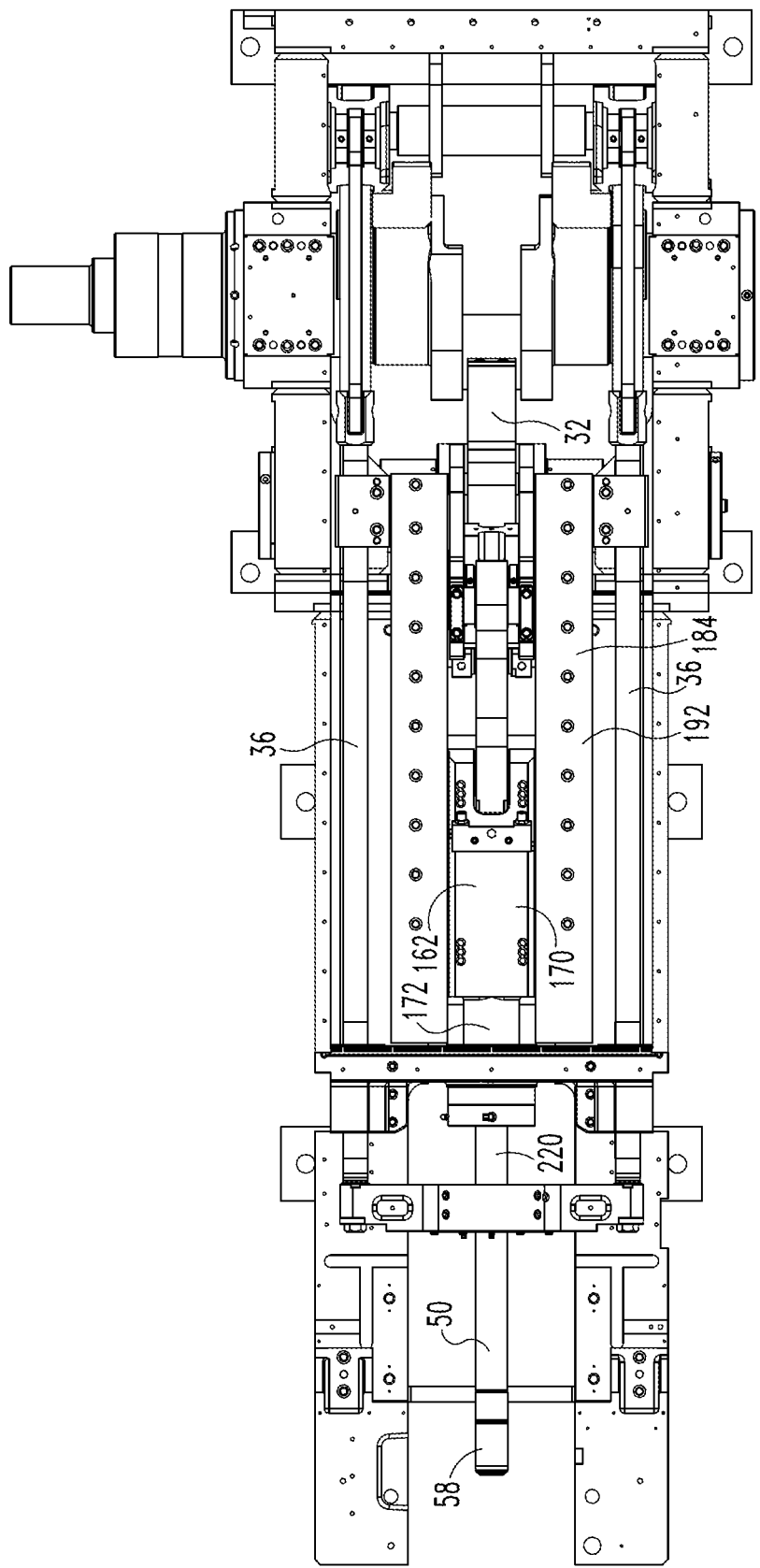
FIG. 13 is a top view of another embodiment of an outboard guide bearing assembly.
Figure 15:
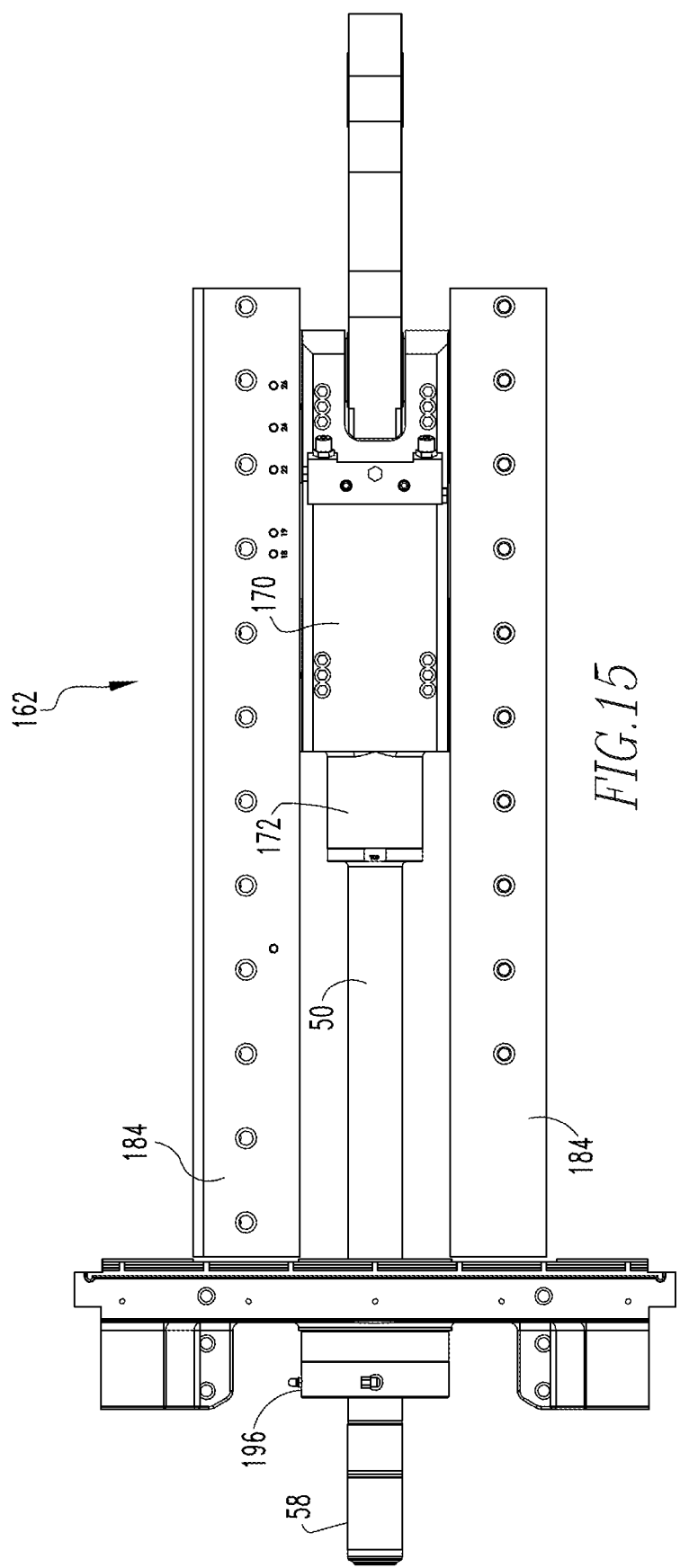
FIG. 15 is a top view of another embodiment of an outboard guide bearing assembly.

With either embodiment of the outboard guide bearing assembly 60, 160, the ram body proximal end 52 is coupled to, directly coupled to, or fixed to the carriage assembly ram coupling 72 and the ram body 50 extends therefrom, the ram body 50 is a cantilever member 120, 220 (FIGS. 8 and 13). It is noted that the assemblies, such as but not limited to an air blade 44 and a mechanical stripper 46, to the right of the redraw sleeve 40 as shown in FIG. 3, does not support the ram body 50.

Further, a cantilever member 120 has a "cantilever length" which is the length of the cantilever member beyond the support that is closest to the unsupported end. As noted above, in the prior art wherein a ram body 50 moved through a bearing assembly 60, the cantilever length of the prior art ram body had a dynamic cantilever length. That is, the cantilever length depended upon the length of the ram body 50 extending through the bearing assembly 60. As the ram body 50 of the exemplary embodiment does not extend through a bearing assembly 60, the cantilever length of the cantilever member 120 remains constant during the reciprocal motion of the carriage assembly 62.

Figure 10A:
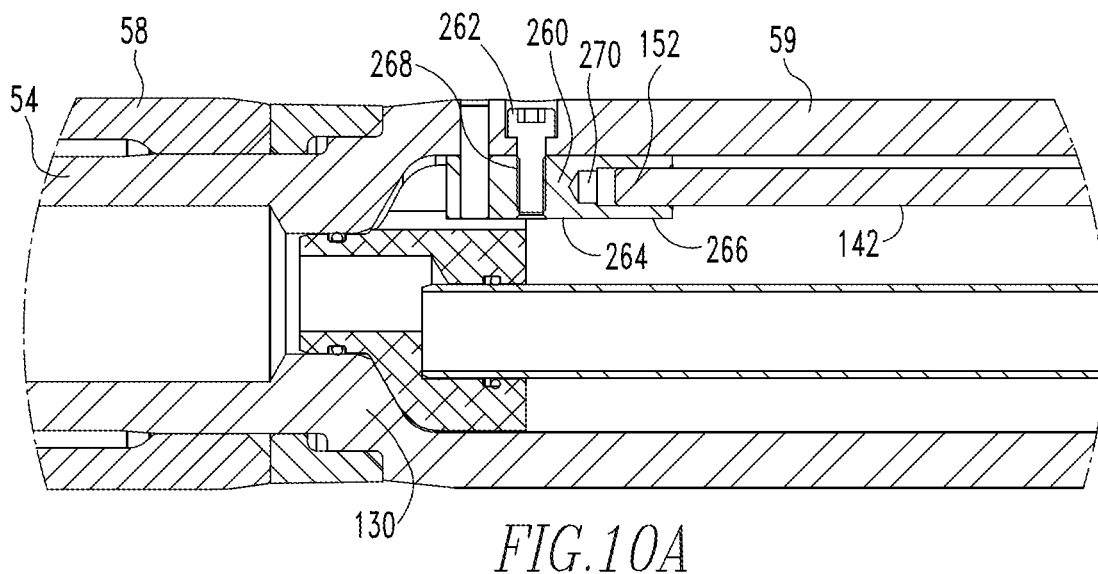
FIG. 10A is a detail cross-sectional view of the medial portion of the ram body.
Figure 10B:
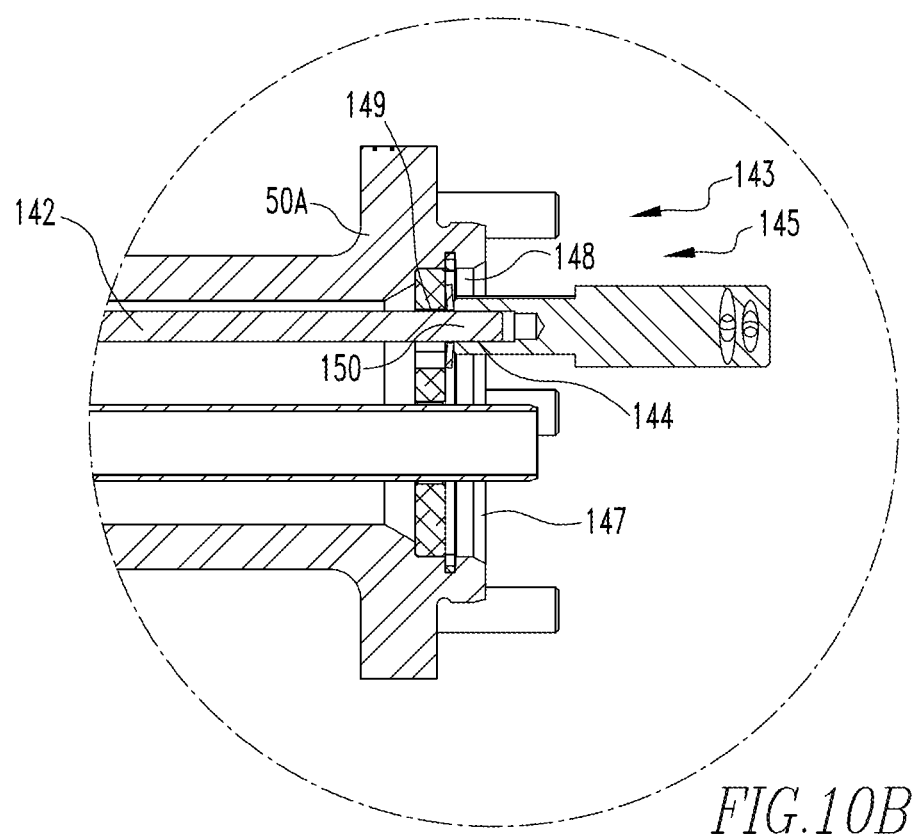
FIG. 10B is a detail cross-sectional view of the proximal end of the ram body.
Figure 11:
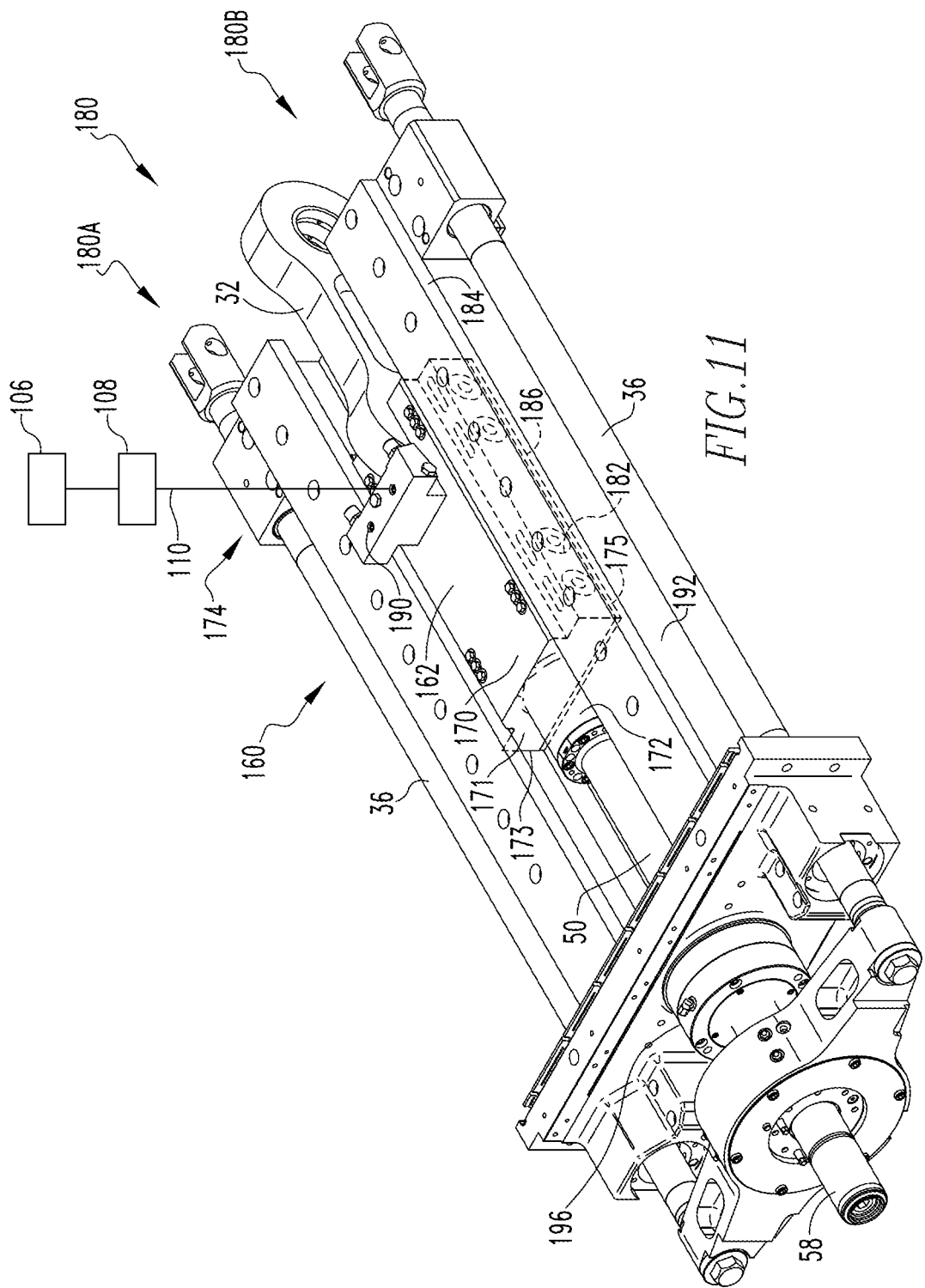
FIG. 11 is a first isometric view of another embodiment of an outboard guide bearing assembly.

In another exemplary embodiment, shown in FIGS. 10, 10A, and 10B, the ram assembly 12 includes an elongated, substantially circular, generally hollow ram body 50A. As before, the ram body 50A includes a proximal end 52, a distal end 54, and a longitudinal axis 56, as well as a medial portion 59. In an exemplary embodiment, and at the ram body medial portion 59, the inner surface of the hollow ram body 50A includes an inwardly extending flange 130. In this exemplary embodiment, the ram body flange 130 is the boundary between the ram body distal end 54 and the ram body medial portion 59.

The punch 58 is disposed on the ram body distal end 54 beyond the inwardly extending flange 130. That is, the ram body distal end 54 has a reduced radius relative to the ram body proximal end 52 and ram body medial portion 59. The punch 58 is generally cylindrical and includes a hollow body 57. The outer diameter of the punch body 57 is substantially the same as the outer diameter of the ram body medial portion 59 and proximal end 52. The punch 58 is disposed over, and coupled to, the ram body distal end 54. In this configuration, the outer transition between the punch 58 and the ram body medial portion 59 is substantially smooth. In this exemplary embodiment, the ram assembly 12 also includes a tension assembly 140.

The tension assembly 140 is structured to place the ram body 50A under tension and thereby reduce the ram droop. In an exemplary embodiment, the tension assembly 140 includes an elongated support member 142, a proximal coupling assembly 144, and a distal coupling assembly 146. The support member 142 includes a proximal end 150, a distal end 152, and a longitudinal axis 154. The support member 142 is, in an exemplary embodiment, one of a rigid member or a tension member. The support member 142 is substantially disposed within the ram body 50A.

The tension assembly proximal coupling assembly 144 is disposed at the ram body proximal end 52. The tension assembly proximal coupling assembly 144 is, in an exemplary embodiment, an adjustable coupling assembly 148. That is, in an exemplary embodiment, the support member proximal end 150 and the tension assembly proximal coupling assembly 144 are threaded couplings, e.g., a threaded rod 143 and a captive nut 145, respectively. As shown, the support member proximal end 150 extends through an axial passage 149 within the ram body proximal end 52. As shown, the ram body proximal end axial passage 149 is disposed on a collar 147 that defines an inwardly extending flange.

The tension assembly distal coupling assembly 146 is disposed at one of the ram body medial portion 59 or ram body distal end 54. In an exemplary embodiment, the tension assembly distal coupling assembly 146 is disposed at the ram body flange 130. In an exemplary embodiment, the tension assembly distal coupling assembly 146 includes a mounting 260 and a mounting coupling assembly 262. That is, the mounting coupling assembly 262 includes the coupling components, described below, that coupled the mounting 260 to the ram body 50A. The tension assembly distal coupling assembly mounting 260 includes a body 264 defining an axial, first coupling assembly 266 and a radial, second coupling assembly 268. The tension assembly distal coupling assembly mounting body 264 is otherwise sized and shaped to fit within the ram body 50A at the ram body flange 130. The tension assembly distal coupling assembly mounting body first coupling assembly 266 includes, in an exemplary embodiment, a threaded cavity 270. In an alternate embodiment, the cavity 270 includes radial pins and passages therefor (not shown.) The tension assembly distal coupling assembly mounting body first coupling component cavity 270 corresponds to the support member distal end 152. Thus, when the support member distal end 152 is threadably disposed in the tension assembly distal coupling assembly mounting body first coupling component cavity 270 it couples the support member 142 to the tension assembly distal coupling assembly mounting body 264.

The tension assembly distal coupling assembly mounting body 264 is coupled to the ram body 50A by the tension assembly distal coupling assembly mounting body second coupling assembly 268. In an exemplary embodiment, the tension assembly distal coupling assembly mounting body second coupling assembly 268 includes a threaded bore 290, which extends generally radially, in the tension assembly distal coupling assembly mounting body 264. The tension assembly distal coupling assembly mounting body second coupling assembly 268 also includes a fastener 292 and a radial passage 294 through the ram body medial portion 59 at the flange 130. The tension assembly distal coupling assembly mounting body 264 is disposed within the ram body 50A at the flange 130. The tension assembly distal coupling assembly mounting body second coupling component fastener 292 is passed through the tension assembly distal coupling assembly mounting body second coupling component radial passage 294 and threaded into the tension assembly distal coupling assembly mounting body second coupling component threaded bore 290, thereby coupling, and fixing, the tension assembly distal coupling assembly mounting 260 to the ram body 50A.

The support member 142 extends between, and is coupled to, the tension assembly proximal coupling assembly 144 and the tension assembly distal coupling assembly 146. The support member 142 is placed under tension. The coupling of the support member distal end 152 to the tension assembly distal coupling assembly 146 is described above. As further noted above, and in an exemplary embodiment, the support member proximal end 150 and the tension assembly proximal coupling assembly 144 are threaded couplings, e.g., a threaded rod 143 and a captive nut 145, respectively. That is, the support member proximal end 150 is threaded. In this configuration, the tension in the support member 142 can be easily adjusted. That is, the captive nut 145 is threaded onto the support member proximal end 150 and drawn against the ram body proximal end collar 147. The captive nut 145 is drawn against the ram body proximal end collar 147 creating tension in the support member 142. Thereafter, rotating the captive nut 145 on the threaded rod 143 increases or decreases the tension on support member 142.

Further, in an exemplary embodiment, the support member 142 is disposed above, and aligned with, the ram body longitudinal axis 56. That is, the support member longitudinal axis 154 is generally parallel to, and spaced from, the ram body longitudinal axis 56.

In another exemplary embodiment, shown in FIGS. 14 and 14A, a tension assembly 340 is structured to be substantially enclosed. That is, in this embodiment, the construct that couples the mounting body to the ram body 50A is not exposed on the ram body 50A outer surface. In this configuration, the construct that couples the mounting body 264 to the ram body 50A is not in a position that causes wear and tear on a seal assembly 196. Thus, as shown in FIG. 14, the support member 142 and the tension assembly proximal coupling assembly 144 are substantially as described above. In this embodiment, however, the tension assembly distal coupling assembly 146 is as described below.

In this exemplary embodiment, the tension assembly distal coupling assembly 146 includes a mounting 360 and a mounting coupling assembly 362. That is, the mounting coupling assembly 362 includes the coupling components, described below, that coupled the mounting 360 to the ram body 50A. The tension assembly distal coupling assembly mounting 360 includes a body 364 having a first, distal end 363 and a second, proximal end 365 as well as defining the axial, first coupling assembly 366 and a radial, second coupling assembly 368. The tension assembly distal coupling assembly mounting body 264 is sized and shaped to fit within the ram body 50A and extend over the ram body flange 130. That is, when installed, the tension assembly distal coupling assembly mounting body distal end 363 is disposed on the distal side of the flange 130.

The tension assembly distal coupling assembly mounting body first coupling component 266 is disposed on the tension assembly distal coupling assembly mounting body proximal end 365 and includes, in an exemplary embodiment, a threaded cavity 370. The tension assembly distal coupling assembly mounting body first coupling component cavity 370 corresponds to the support member distal end 252. In this exemplary embodiment, the support member distal end 252 includes threads 374. Thus, the support member distal end 252 is threadably coupled to the tension assembly distal coupling assembly mounting body first coupling component cavity 370.

The tension assembly distal coupling assembly mounting body 364 is coupled to the ram body 50A by the tension assembly distal coupling assembly mounting body second coupling assembly 368. In an exemplary embodiment, the tension assembly distal coupling assembly mounting body second coupling assembly 368 includes a threaded bore 390, which extends generally radially, in the tension assembly distal coupling assembly mounting body 364. The tension assembly distal coupling assembly mounting body second coupling assembly 368 also includes a fastener 392 and a radial passage 394 through the ram body distal end 54 at a location distal to the flange 130. The tension assembly distal coupling assembly mounting body 364 is disposed within the ram body 50A at the flange 130. The tension assembly distal coupling assembly mounting body second coupling component fastener 392 is passed through the tension assembly distal coupling assembly mounting body second coupling component radial passage 394 and threaded into the tension assembly distal coupling assembly mounting body second coupling component threaded bore 390, thereby coupling, and fixing, the tension assembly distal coupling assembly mounting 260 to the ram body 50A.

It is noted that, when the ram assembly 12 is assembled, the tension assembly distal coupling assembly 146 is disposed below/within the punch 58. Stated alternately, the punch 58 covers the tension assembly distal coupling assembly 146. Thus, in operation, as the ram body reciprocates between the first and the second positions, the tension assembly distal coupling assembly 146 is not exposed and cannot contact a seal assembly 196. As used herein, a coupling assembly that is not visible from outside the ram body 50A is a "hidden coupling." Thus, in this embodiment, the tension assembly distal coupling assembly mounting body second coupling assembly 368 is a hidden coupling.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof

What is claimed is:

1. A guide bearing assembly for a can bodymaker, said bodymaker including an elongated ram body, a crank arm, carriage assembly, and a die pack defining a passage, said carriage assembly including a body with a ram coupling and a crank coupling, said crank arm coupled to said carriage assembly body crank coupling, said ram body coupled to said carriage assembly body ram coupling, said guide bearing assembly comprising:

a first guide bearing assembly including a saddle and a journal channel; and a second guide bearing assembly including a saddle and a journal channel, wherein said journal channel of said first guide bearing assembly is disposed apart from said journal channel of said second guide bearing assembly such that said body of said carriage assembly is disposed therebetween, wherein said saddle of said first guide bearing assembly and said saddle of said second guide bearing assembly are structured to orient said ram body with said die pack passage, wherein each saddle includes a number of thrust pad assemblies, wherein each saddle is structured to produce a sufficient amount of fluid to establish an aligning fluid bearing stiffness, wherein each of said thrust pad assemblies includes a forward thrust pad assembly, a rear thrust pad assembly spaced from said forward thrust pad assembly, and at least one medial thrust pad assembly disposed therebetween, wherein said front thrust pad assembly, said at least one medial thrust pad assembly, and said rear thrust pad assembly of said first guide bearing assembly are disposed on the body of said carriage assembly to move through said journal channel of said first guide bearing assembly; and wherein said front thrust pad assembly, said at least one medial thrust pad assembly, and said rear thrust pad assembly of said second guide bearing assembly are disposed on the body of said carriage assembly to move through said journal channel of said second guide bearing assembly, and wherein each of said forward thrust pad assembly, said at least one medial thrust pad assembly, and said rear thrust pad assembly of said first guide bearing assembly includes an upper pad portion located on an upper side of said body of said carriage assembly, a lateral pad portion located on a lateral side of said body of said carriage assembly, and a lower pad portion located on a lower side of said body of said carriage assembly; and wherein each of said forward thrust pad assembly, said at least one medial thrust pad assembly, and said rear thrust pad assembly of said second guide bearing assembly includes an upper pad portion located on an upper side of said body of said carriage assembly, a lateral pad portion located on a lateral side of said body of said carriage assembly, and a lower pad portion located on a lower side of said body of said carriage assembly.

2. The guide bearing assembly of claim 1 wherein:
each of said first guide bearing assembly and said second guide bearing assembly includes a fluid distribution assembly structured to provide a balanced fluid flow to each of said thrust pad assemblies.

3. The guide bearing assembly of claim 2 wherein:
said fluid distribution assembly includes a number of selectively closable fluid passages.

4. The guide bearing assembly of claim 1 wherein said upper pad portion and said lower pad portion of said rear thrust pad assembly of said first guide bearing assembly are aligned, and said lateral pad portion of said rear thrust pad assembly of said first guide bearing assembly is offset from said upper pad portion and said lower pad portion of said rear thrust pad assembly of said first guide bearing assembly in the longitudinal direction of said ram body; and wherein said upper pad portion and said lower pad portion of said rear thrust pad assembly of said second guide bearing assembly are aligned, and said lateral pad portion of said rear thrust pad assembly of said second guide bearing assembly is offset from said upper pad portion and said lower pad portion of said rear thrust pad assembly of said second guide bearing assembly in the longitudinal direction of said ram body.

5. The guide bearing assembly of claim 4 wherein said upper pad portion, said lateral pad portion, and said lower pad portion of said forward thrust pad assembly of said first guide bearing assembly are aligned; wherein said upper pad portion, said lateral pad portion, and said lower pad portion of said forward thrust pad assembly of said second guide bearing assembly are aligned; wherein said upper pad portion, said lateral pad portion, and said lower pad portion of each of said at least one medial thrust pad assembly of said first guide bearing assembly are aligned; and wherein said upper pad portion, said lateral pad portion, and said lower pad portion of each of said at least one medial thrust pad assembly of said second guide bearing assembly are aligned.

6. A can bodymaker comprising:
a die pack defining a passage;
an elongated ram body;
a crank arm;
a carriage assembly including a body with a ram coupling and a crank coupling, said crank arm coupled to said carriage assembly body crank coupling, said ram body coupled to said carriage assembly ram coupling; and
a guide bearing assembly comprising:
a first guide bearing assembly including a saddle and a journal channel; and
a second guide bearing assembly including a saddle and a journal channel,
wherein said journal channel of said first guide bearing assembly is disposed apart from said journal channel of said second guide bearing assembly such that said body of said carriage assembly is disposed therebetween,
wherein said saddle of said first guide bearing assembly and said saddle of said second guide bearing assembly are structured to orient said ram body with said die pack passage,
wherein each saddle includes a number of thrust pad assemblies,
wherein each saddle is structured to produce a sufficient amount of fluid to establish an aligning fluid bearing stiffness,
wherein each of said thrust pad assemblies includes a forward thrust pad assembly, a rear thrust pad assembly spaced from said forward thrust pad assembly, and at least one medial thrust pad assembly disposed therebetween,
wherein each of said forward thrust pad assembly, said at least one medial thrust pad assembly, and said rear thrust pad assembly of said first guide bearing assembly includes an upper pad portion located on an upper side of said body of said carriage assembly, a lateral pad portion located on a lateral side of said body of said carriage assembly, and a lower pad portion located on a lower side of said body of said carriage assembly; and wherein each of said forward thrust pad assembly, said at least one medial thrust pad assembly, and said rear thrust pad assembly of said second guide bearing assembly includes an upper pad portion located on an upper side of said body of said carriage assembly, a lateral pad portion located on a lateral side of said body of said carriage assembly, and a lower pad portion located on a lower side of said body of said carriage assembly.

7. The can bodymaker of claim 6 wherein said front thrust pad assembly, said at least one medial thrust pad assembly, and said rear thrust pad assembly of said first guide bearing assembly are disposed on the body of said carriage assembly to move through said journal channel of said first guide bearing assembly; and wherein said front thrust pad assembly, said at least one medial thrust pad assembly, and said rear thrust pad assembly of said second guide bearing assembly are disposed on the body of said carriage assembly to move through said journal channel of said second guide bearing assembly.

8. The can bodymaker of claim 7 wherein:
each of said first guide bearing assembly and said second guide bearing assembly includes a fluid distribution assembly structured to provide a balanced fluid flow to each of said thrust pad assemblies.

9. The can bodymaker of claim 8 wherein:
said fluid distribution assembly includes a number of selectively closable fluid passages.

10. The can bodymaker of claim 6 wherein said upper pad portion and said lower pad portion of said rear thrust pad assembly of said first guide bearing assembly are aligned, and said lateral pad portion of said rear thrust pad assembly of said first guide bearing assembly is offset from said upper pad portion and said lower pad portion of said rear thrust pad assembly of said first guide bearing assembly in the longitudinal direction of said ram body; and wherein said upper pad portion and said lower pad portion of said rear thrust pad assembly of said second guide bearing assembly are aligned, and said lateral pad portion of said rear thrust pad assembly of said second guide bearing assembly is offset from said upper pad portion and said lower pad portion of said rear thrust pad assembly of said second guide bearing assembly in the longitudinal direction of said ram body.

11. The can bodymaker of claim 10 wherein said upper pad portion, said lateral pad portion, and said lower pad portion of said forward thrust pad assembly of said first guide bearing assembly are aligned; wherein said upper pad portion, said lateral pad portion, and said lower pad portion of said forward thrust pad assembly of said second guide bearing assembly are aligned; wherein said upper pad portion, said lateral pad portion, and said lower pad portion of each of said at least one medial thrust pad assembly of said first guide bearing assembly are aligned; and wherein said upper pad portion, said lateral pad portion, and said lower pad portion of each of said at least one medial thrust pad assembly of said second guide bearing assembly are aligned.

\* \* \* \* \*